US012630249B2

(12) United States Patent
Langlois et al.

(10) Patent No.: US 12,630,249 B2
(45) Date of Patent: May 19, 2026

(54) ELECTRONIC COMPONENT ASSEMBLY FOR A MOTORCYCLE ASSEMBLY

(71) Applicant: Indian Motorcycle International, LLC, Medina, MN (US)

(72) Inventors: Brian K. Langlois, Stacy, MN (US); Ryan P. Lenton, Buffalo, MN (US); Ronald A. Vorndran, Osceola, WI (US); Adam D. Bennett, Lino Lakes, MN (US); Keith B. Steidl, Blaine, MN (US); Nicole A Reilly, Stanchfield, MN (US)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 740 days.

(21) Appl. No.: 17/797,142

(22) PCT Filed: Jan. 27, 2021

(86) PCT No.: PCT/US2021/015299
§ 371 (c)(1),
(2) Date: Aug. 3, 2022

(87) PCT Pub. No.: WO2021/158410
PCT Pub. Date: Aug. 12, 2021

(65) Prior Publication Data
US 2023/0123389 A1 Apr. 20, 2023

Related U.S. Application Data

(60) Provisional application No. 62/969,956, filed on Feb. 4, 2020.

(51) Int. Cl.
*B62J 45/10* (2020.01)
*B62J 6/055* (2020.01)
(Continued)

(52) U.S. Cl.
CPC ............... *B62J 45/10* (2020.02); *B62J 6/055* (2020.02); *B62J 43/20* (2020.02); *B62J 45/20* (2020.02); *B62J 45/41* (2020.02); *B62J 50/26* (2020.02)

(58) Field of Classification Search
CPC ... B52J 45/10; B52J 45/20; B52J 45/41; B52J 43/20; B52J 6/055; B52J 50/26; B62J 15/00
(Continued)

(56) References Cited

U.S. PATENT DOCUMENTS

2002/0029917 A1    3/2002    Galbraith et al.
2008/0179486 A1    7/2008    Russell et al.
(Continued)

FOREIGN PATENT DOCUMENTS

BR    102012024555 A2    9/2013
CN        102649393 A    8/2012
(Continued)

OTHER PUBLICATIONS

English translation of CN 110248864 (Year: 2019).*
(Continued)

*Primary Examiner* — Anne Marie M Boehler
(74) *Attorney, Agent, or Firm* — SCHWEGMAN LUNDBERG & WOESSNER, P.A.

(57) ABSTRACT

A system for a motorized vehicle having a frame and a wheel rotatably coupled to the frame has a first fender housing mounted to the frame, a second fender housing coupled to the first fender housing so that a volume is defined therebetween and an electronic component disposed in the volume.

18 Claims, 39 Drawing Sheets

(51) Int. Cl.

| | |
|---|---|
| *B62J 15/00* | (2006.01) |
| *B62J 43/20* | (2020.01) |
| *B62J 45/20* | (2020.01) |
| *B62J 45/41* | (2020.01) |
| *B62J 50/26* | (2020.01) |

(58) Field of Classification Search
USPC .................................. 293/105, 106; 224/423
See application file for complete search history.

(56) References Cited

U.S. PATENT DOCUMENTS

| | | |
|---|---|---|
| 2010/0194131 A1 | 8/2010 | Shigeta |
| 2010/0194149 A1 | 8/2010 | Yamamoto |
| 2016/0013545 A1 | 1/2016 | Hashimoto |
| 2017/0101148 A1 | 4/2017 | Koishikawa et al. |
| 2019/0359152 A1 | 11/2019 | Diaz, Jr. |
| 2020/0031293 A1 | 1/2020 | Conine et al. |

FOREIGN PATENT DOCUMENTS

| | | | | |
|---|---|---|---|---|
| CN | 103863445 A | 6/2014 | | |
| CN | 204567889 U | 8/2015 | | |
| CN | 105143028 A | 12/2015 | | |
| CN | 110248864 A * | 9/2019 | .............. | B62J 27/00 |
| CN | 115279654 A | 11/2022 | | |
| CN | 115279654 B | 3/2024 | | |
| CN | 118083016 A | 5/2024 | | |
| EP | 2180544 A1 * | 4/2010 | .......... | B60R 25/102 |
| EP | 4100304 A1 | 12/2022 | | |
| EP | 4100304 B1 | 2/2024 | | |
| EP | 4328092 A2 | 2/2024 | | |
| EP | 4328092 A3 | 5/2024 | | |
| EP | 4328092 B1 | 9/2025 | | |
| JP | S57191174 A | 11/1982 | | |
| JP | S58102392 U | 7/1983 | | |
| JP | 2002284071 A | 10/2002 | | |
| JP | 2010-120626 A | 6/2010 | | |
| JP | 2010274918 A | 12/2010 | | |
| JP | 2013071675 A | 4/2013 | | |
| JP | 2014136658 A | 7/2014 | | |
| JP | 5700468 B2 | 4/2015 | | |
| JP | 5812392 B2 | 11/2015 | | |
| JP | 2023512766 A | 3/2023 | | |
| JP | 7493603 B2 | 5/2024 | | |
| JP | 2024109736 A | 8/2024 | | |
| WO | WO-2014/136658 A1 | 9/2014 | | |
| WO | WO-2017199144 A1 | 11/2017 | | |
| WO | WO-2019064951 A1 | 4/2019 | | |
| WO | WO-2021158410 A1 | 8/2021 | | |
| WO | WO-2021158410 A4 | 10/2021 | | |

OTHER PUBLICATIONS

International Search Report and Written Opinion of the International Searching Authority issued in PCT/US2021/015299, mailed Jun. 9, 2021; ISA/EP.

Chinese Office Action dated Jul. 27, 2023 in corresponding Chinese Application No. 202180021331.1.

Japanese Office Action dated Aug. 1, 2023 in corresponding Japanese Application No. 2022-547701.

"European Application Serial No. 21707501.9, Response to Communication pursuant to Rules 161(2) and 162 EPC filed Mar. 23, 2023", 14 pgs.

"European Application Serial No. 23219549.5, Extended European Search Report mailed Apr. 5, 2024", 9 pgs.

"European Application Serial No. 23219549.5, Response filed Oct. 31, 2024 to Extended European Search Report mailed Apr. 5, 2024", 101 pgs.

"International Application Serial No. PCT/US2021/015299, International Preliminary Report on Patentability mailed Aug. 18, 2022", 16 pgs.

"International Application Serial No. PCT/US2021/015299, Invitation to Pay Additional Fees mailed Apr. 22, 2021", 16 pgs.

"Japanese Application Serial No. 2022-547701, Notification of Reasons for Rejection mailed Jan. 5, 2024", W/English Translation, 6 pgs.

"Japanese Application Serial No. 2022-547701, Response filed Feb. 6, 2024 to Notification of Reasons for Rejection mailed Jan. 5, 2024", W/English Claims, 10 pgs.

"Japanese Application Serial No. 2022-547701, Response filed Sep. 25, 2023 to Notification of Reasons for Rejection mailed Jul. 31, 2023", W/English Claims, 16 pgs.

"Japanese Application Serial No. 2024-082337, Notification of Reasons for Rejection mailed Jun. 4, 2025", W/English Translation, 8 pgs.

"Japanese Application Serial No. 2024-082337, Response filed Nov. 17, 2025 to Notification of Reasons for Rejection mailed Jun. 4, 2025", W/ English Claims, 9 pgs.

"Japanese Application Serial No. 2024-082337, Decision of Refusal mailed Feb. 26, 2026", 4 pgs.

"Japanese Application Serial No. 2024-082337, Examiners Decision of Final Refusal mailed Feb. 26, 2026", With English Machine Translation, 5 pgs.

* cited by examiner

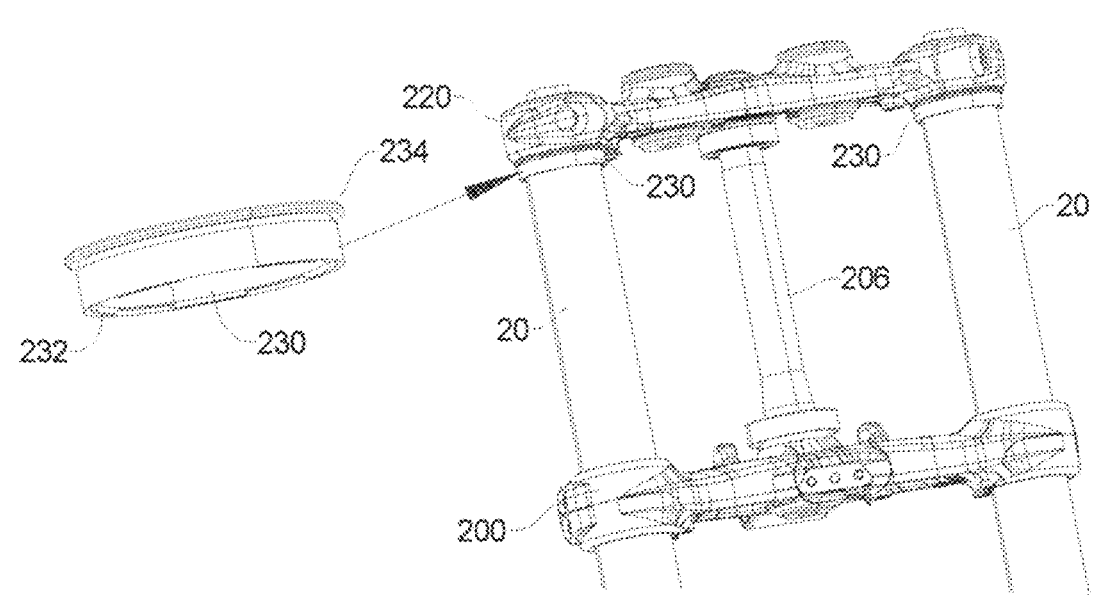
FIG. 4F
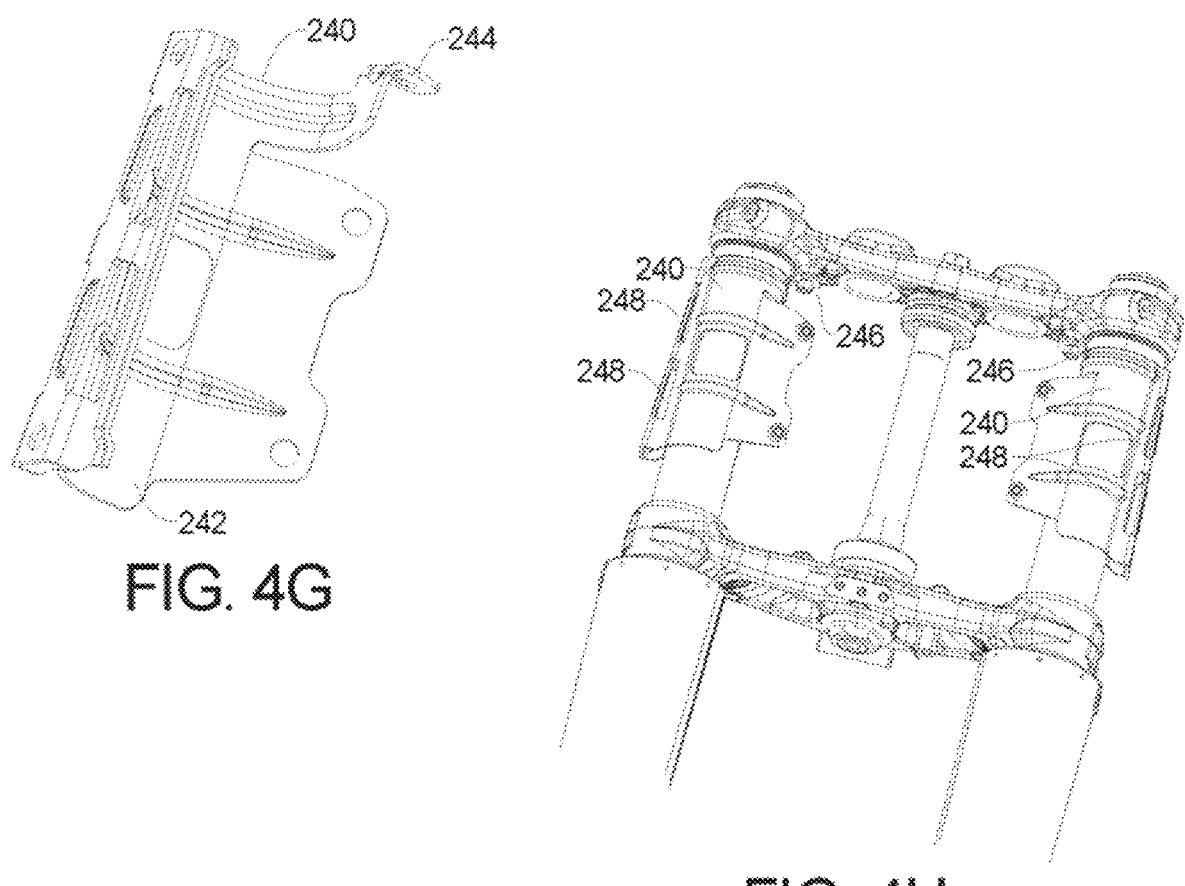
FIG. 4G
FIG. 4H

ELECTRONIC COMPONENT ASSEMBLY FOR A MOTORCYCLE ASSEMBLY

CROSS-REFERENCE TO RELATED APPLICATIONS

This application is a 371 U.S. National Phase of International Application No. PCT/US2021/015299 filed on Jan. 27, 2021, which claims the benefit of U.S. Provisional Application No. 62/969,956, filed on Feb. 4, 2020. The entire disclosures of the above applications are incorporated herein by reference.

FIELD

The present disclosure relates to a motorcycle and, more particularly, to rear configuration for housing electronic components of the motorcycle.

BACKGROUND

This section provides background information related to the present disclosure which is not necessarily prior art.

Motorcycle designs have been around since the late 1800s. Retro style motorcycles of the mid 1900s era are popular with motorcycle enthusiasts.

Even though retro style motorcycles are popular, motorcycle enthusiasts also have become familiar with many of the modern aspects of automotive vehicles. Electronic features such as navigation, anti-lock brakes and other features are desirable for motorcycle enthusiasts as well. The complexities of implementing such features is complex. Various wiring harnesses and fluid hoses are used to provide various functions. Providing a lot of modern functions requires a significant amount of electronic circuitry to be incorporated into the vehicle. Maintaining the retro styling of vehicles is a challenge when wires and electronic components of modern features are to be incorporated into the motorcycle.

SUMMARY

This section provides a general summary of the disclosure, and is not a comprehensive disclosure of its full scope or all of its features.

The present disclosure provides a motorcycle assembly that allows the incorporation of modern electrical components in a package hiding visibility of such components.

In one aspect of the disclosure, a system for a motorized vehicle having a frame and a wheel rotatably coupled to the frame has a first fender housing mounted to the frame, a second fender housing coupled to the first fender housing so that a volume is defined therebetween and an electronic component disposed in the volume.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4F is a partially assembled view of the top of the forks relative to the triple clamps.

FIG. 4G is a perspective view of a clamp for the top of the forks.

FIG. 4H is a perspective view of the clamp of FIG. 4G partially assembled onto the top of the forks.

Corresponding reference numerals indicate corresponding parts throughout the several views of the drawings.

DETAILED DESCRIPTION

Figure 1A:
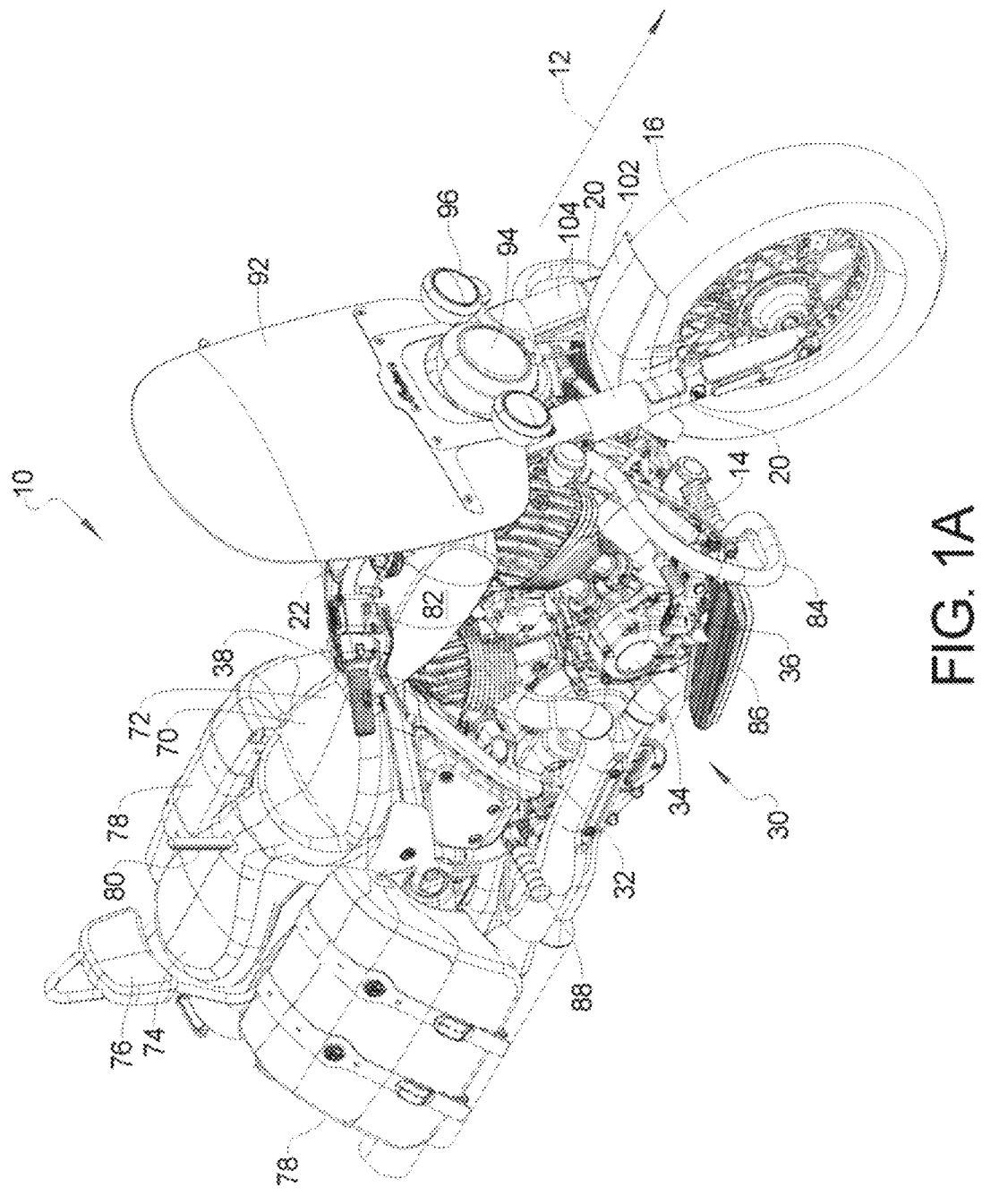
FIG. 1A is a perspective view of a first example of a motorcycle.
Figure 1B:
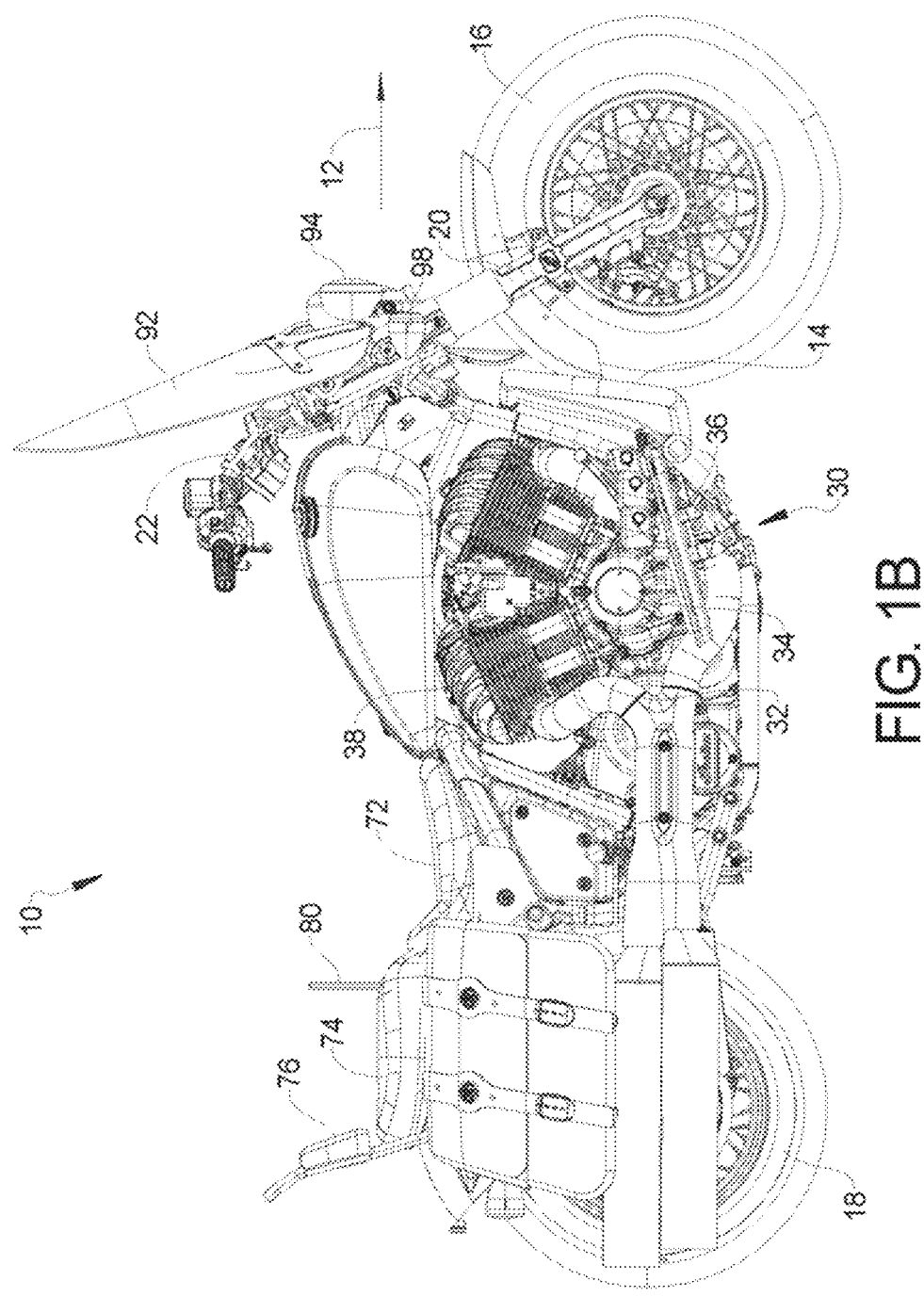
FIG. 1B is a right side view of the motorcycle of FIG. 1A.

Example embodiments will now be described more fully with reference to the accompanying drawings. Although the following description includes a motorcycle application, it is understood that the features herein may be applied to any appropriate vehicle, such as snowmobiles, all-terrain vehicles, utility vehicles, moped and scooters. The embodiments disclosed below are not intended to be exhaustive or to limit the invention to the precise forms disclosed in the following detailed description. Rather, the embodiments are chosen and described so that others skilled in the art may utilize theft teachings.

The relative terms used in the present disclosure are relative to a motorcycle 10 in a normal operating position. The vehicle direction in FIG. 1 with a longitudinal axis 12 that corresponds to a normal direction of travel. Right, left, front, back, under and above all referred to relative position of the vehicle in a normal upright position on a road surface.

Although the present examples are set forth with respect to a motorcycle, many of the teachings set forth herein also apply to scooters and other open vehicle designs such as a utility vehicle.

Referring now to FIGS. 1A-1E, various motorcycles designs are illustrated. The motorcycle 10 is illustrated as a touring style motorcycle. However, the present example is also applicable to other types of motorcycles as well as other types of vehicles including, but not limited, to snowmobiles, scooters, utility vehicles and off-road vehicles.

The motorcycle 10 includes a frame 14 that is used to support the vehicle components including a front wheel 16 and a rear wheel 18. The front wheel 16 is coupled to the fork 20. The fork 20 rotates relative to the frame 14 to provide steering for the vehicle. The forks 20 are coupled to handlebars 22 that used for turning the forks 20 relative to the frame 14.

The rear wheel 18 is coupled to the frame 14 and the powertrain assembly 30. The powertrain assembly 30 is used to provide a rotational force to the rear wheel 18, in this example. Of course, all of the wheels on a vehicle or a selected few of the wheels may be coupled to the powertrain assembly 30. The powertrain assembly 30 includes an engine 32 and a transmission 34. The engine 32 has a front cylinder bank 36 and a rear cylinder bank 38. Both the front cylinder bank 36 and the rear cylinder bank 38 house a cylinder and a piston (not shown). The combustion process takes place within the cylinders. The rotational force of the cylinders on the crankshaft (not shown) is provided to the transmission 34 which rotates and therefore rotates a chain or belt to drive the rear wheels.

Figure 1C:
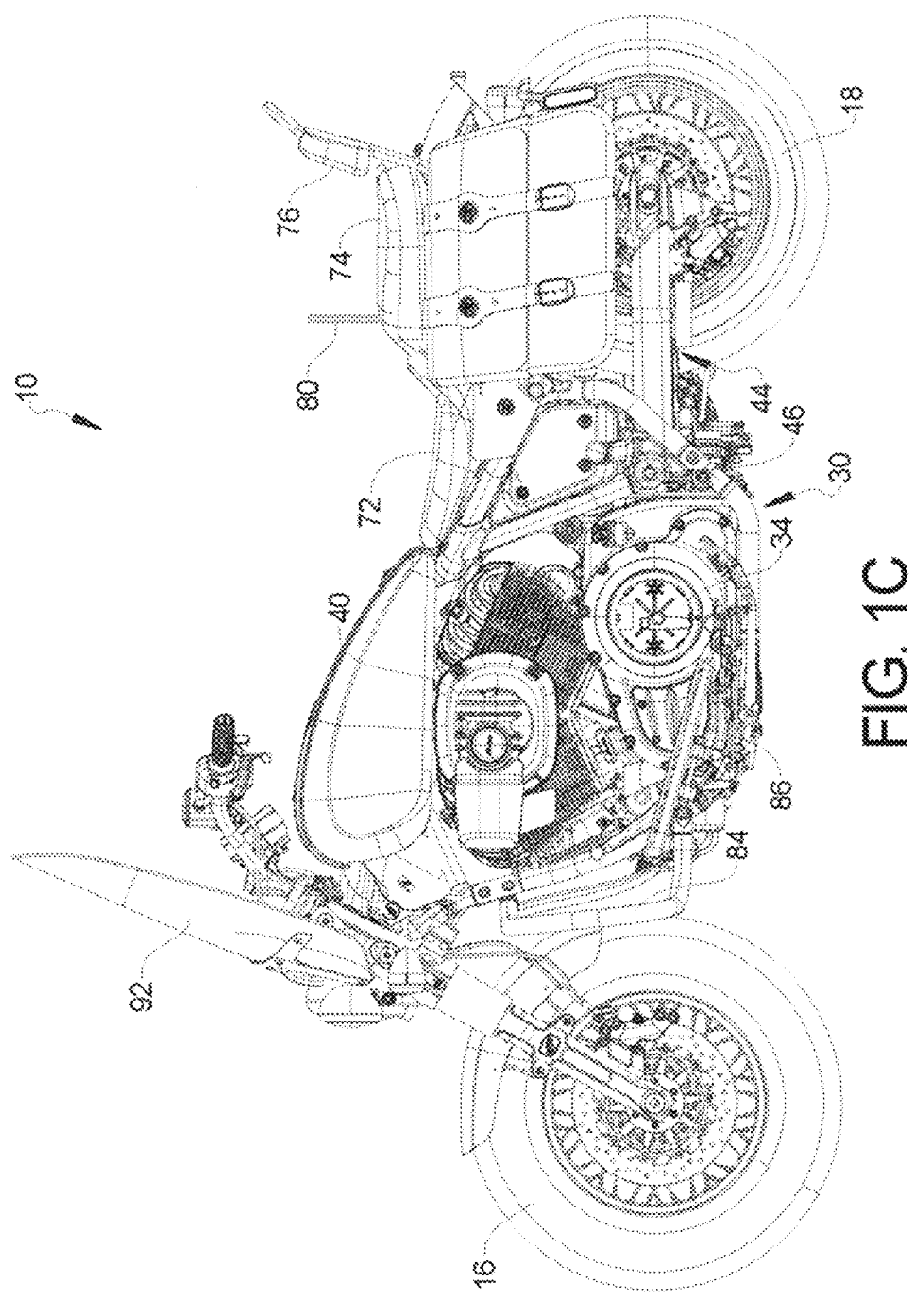
FIG. 1C is a left side view of the motorcycle of FIG. 1A.
Figure 1D:
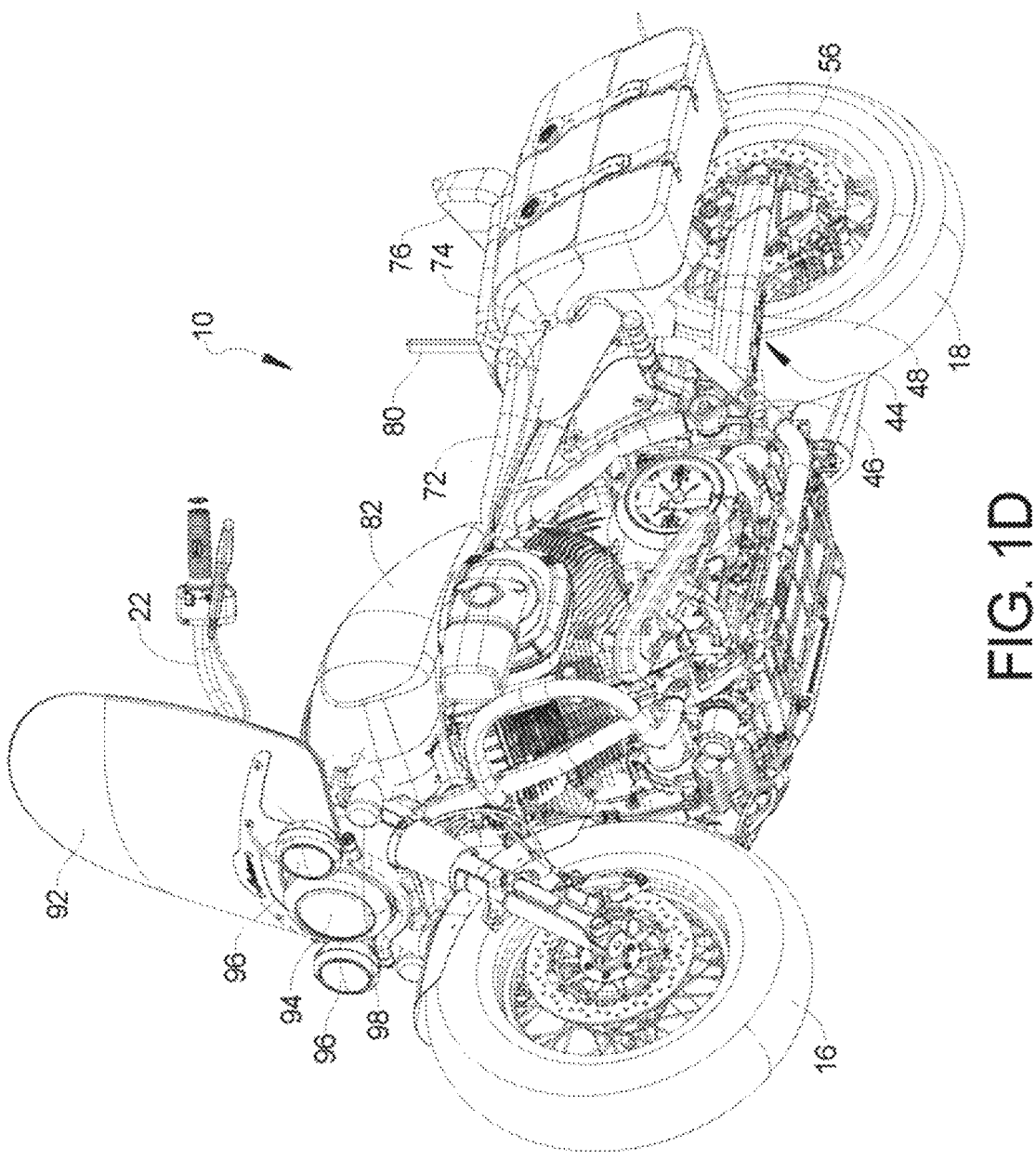
FIG. 1D is a lower front perspective view of the left side of the motorcycle of FIG. 1A.

The rear wheel 18, as is best illustrated in FIG. 1C, is coupled to the frame 14 by way of a rear suspension 44. A pivot mount 46 disposed on the frame 14 is used to couple the rear suspension 44 to the frame. A shock absorber 48 extends from a shock mount 50 which is disposed on the frame but at a different location. The shock mount 50 is mounted above and behind the pivot mount 46. The shock mount 50 couples one end of the shock absorber 48 to the frame 14. An extension mount 52 couples the other end of the shock absorber to the frame 14. The extension mount 52 is disposed on a swing arm 56. The swing arm 56 is mounted to the pivot mount 46 and to the rear wheel 18. As is illustrated best in FIG. 1E, the shock absorber 48 is disposed at an angle theta relative to the horizontal plane on which the vehicle is traveling at about the same as the upper twin portion 62 of the frame. The shock absorber may be within 10° or more preferably within 5° of the angle Beta of the upper twin portion 62 of the frame 14.

The engine 32 includes an air box 40 for providing air to the engine 32 during the combustion process.

Figure 1E:
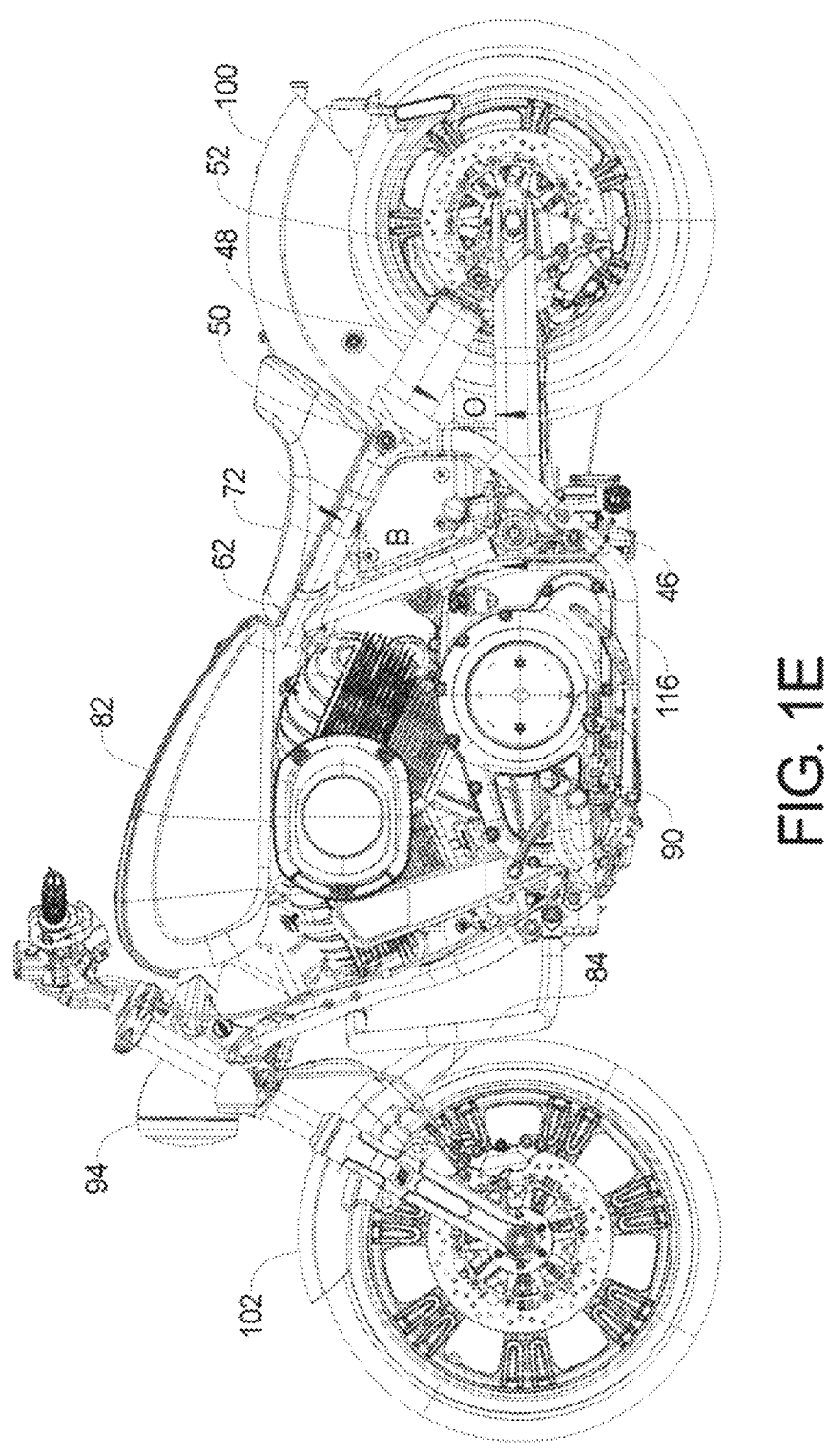
FIG. 1E is a left side view of a second design of a motorcycle.

The motorcycle 10 has a seat 70 that has a first seating position 72 and a second seating position 74. The second seating position 74 includes a backrest 76. Various seating configurations may be used for different models of the motorcycle 10. That is, only a front seat, a front seat that is suspended or no second seating position 74 may be provided. Also, the backrest 76 may also be eliminated. The first seating position 72 and the second seating position 74 may be mounted to the frame as illustrated in FIG. 1E while the rear seating position may be mounted to a rear fender assembly 100 as is best illustrated in FIG. 1E.

A saddle bag 78, two of which are illustrated, are mounted to the vehicle frame. The saddle bags 78 may be formed of various synthetic or natural materials. For example, cloth, vinyl, plastic, leather may all be used for the saddle bag material. A grab strap 80 may be positioned at the second seating position 74 so that the rear passenger has something to hold onto.

A fuel tank 82 is mounted to the frame 14. Details of the mounting of the fuel tank 82 is described in further detail below. Other features mounted to the frame 14 include some stylistic features such as highway bars 84, a footrest 86, a passenger foot peg 88, and a driver foot peg 90 illustrated in FIG. 1E. As is illustrated in FIGS. 1A-1E, various seating foot peg and other foot resting positions may be provided for different configurations of the motorcycle 10.

The front end of the vehicle may include a windscreen 92, a headlight 94, fog lights 96 and turn signals 98.

The front forks 20 may support a front fender 102. A fork cover 104 may be disposed over at least a portion of the front forks 20. The fork cover 104 may be referred to a "cowbell".

Referring now to FIGS. 2A-2E, and 3A-3B the frame 14 is formed of plurality of frame members illustrated in further detail. The frame has a backbone frame member 110. The backbone frame member 110 is a hollow tube disposed in the longitudinal direction of the motorcycle 10 as defined by the longitudinal axis 12 above. Being hollow, the backbone frame member 110 may be used for routing wires therethrough as is described in more detail below. The backbone frame member 110 is coupled to another frame member such as a neck 112. The neck 112 may be welded or otherwise affixed to the backbone frame member 110. The neck 112 is a stationary component that receives the steering assembly that rotates within the neck to turn the motorcycle 10 in the desired direction. Neck 112 is further connected to a pair of frame members referred to as front rails 114. The front rails 114 continue into another frame member, lower rail 116.

A pair of frame members, cross members 118 extend from the backbone frame member 110 to the front rails 114. The upper twin portions 62, which are also frame members, extend from the backbone frame member 110 and continue to other frame members, the lower rear rails 120. The lower rear rails 120 join with the lower rails 116. A pair of additional frame members, cross rails 122 extend from the intersection of the front rails 114, the upper twin portion 62 and the cross rails 122.

The various rails and frame members may be fastened or welded together directly or welded together by way of a joiner. In particular, the cross members 118 join to the backbone frame member 110 with a first joiner 124. The joiner 124 also has a flange 126 having an opening 128 therethrough. As will be described in more detail below, the opening 128 may receive electrical wires that pass therethrough.

The cross members 118 may join to the front rails 114 with a head casting 130. The head casting 130 may also couple a front engine mount 132 thereto. The front engine mount 132 couples to the engine 32 and in particular to the engine block or housing.

A rear engine mount 134 is coupled to the cross rails 122. The engine mounts 134 also mount to the engine block or housing.

A rear joiner 140 connects the backbone frame member 110, the cross rails 122 and the upper twin portions 62. The rear joiner 140 may be a cast member that has an opening 142 therein. Wires may be run from the opening 128 through the backbone frame member 110 and out of the opening 142.

The cross rails 122 include the mount 46. The mount 46 is used to mount a suspension component such as a swing arm as will be described in more detail below.

The engine 32 may also be installed by removing a removable portion 148 of the lower rails 116. The removable portions 148 may be coupled to the lower rails 116 by way of fasteners 150. A bracket 152 may be used to couple directly to the engine 32.

A lower fender 154 is part of the rear fender assembly 100. The lower fender 154 is mounted at the intersection of the lower rear rail 120 and the upper twin portion 62. That is, the lower fender 154 is mounted in the space between the upper twin portions 62 and the lower rear rails 120. The fastener 156 is used in conjunction with the shock mount 50 described above relative to the shock absorber 48.

Figure 2A:
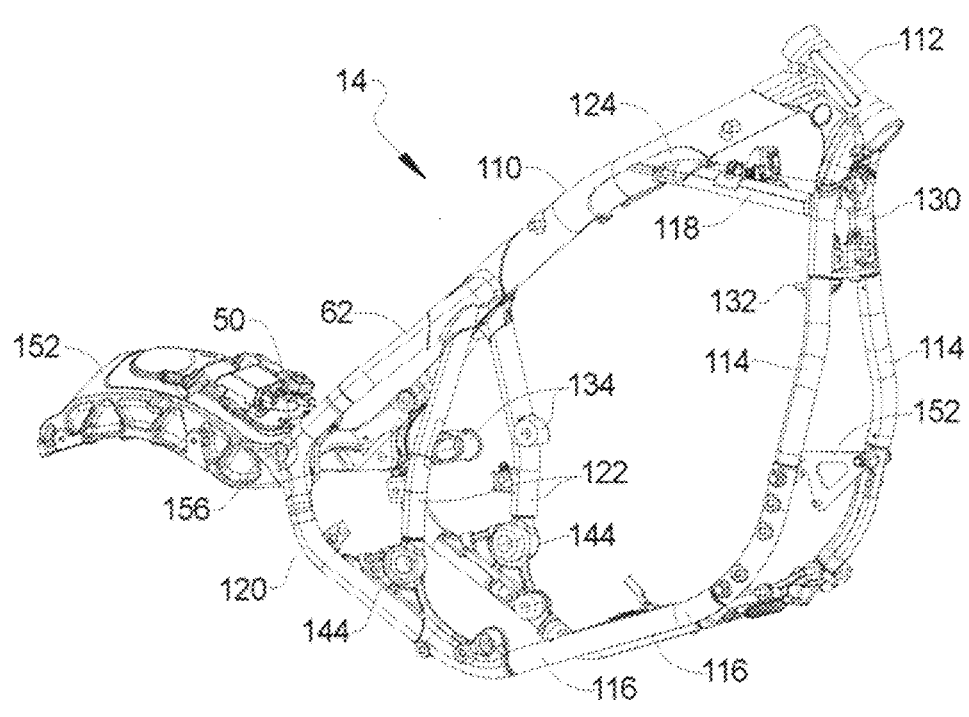
FIG. 2A is a perspective view of the right side of the frame.
Figure 2B:
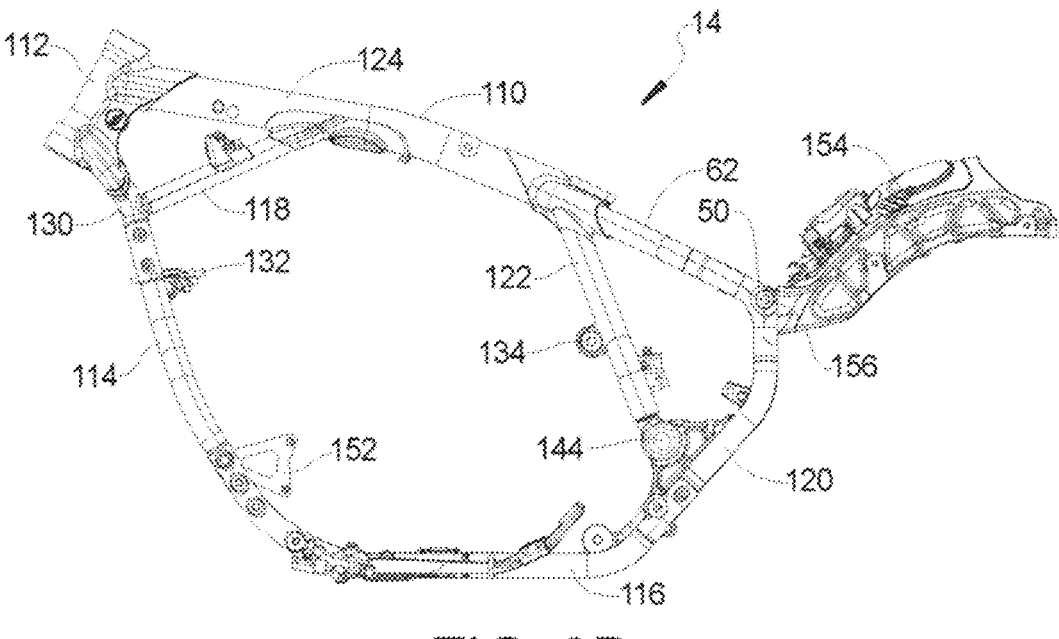
FIG. 2B is a left side view of the frame.
Figure 2C:
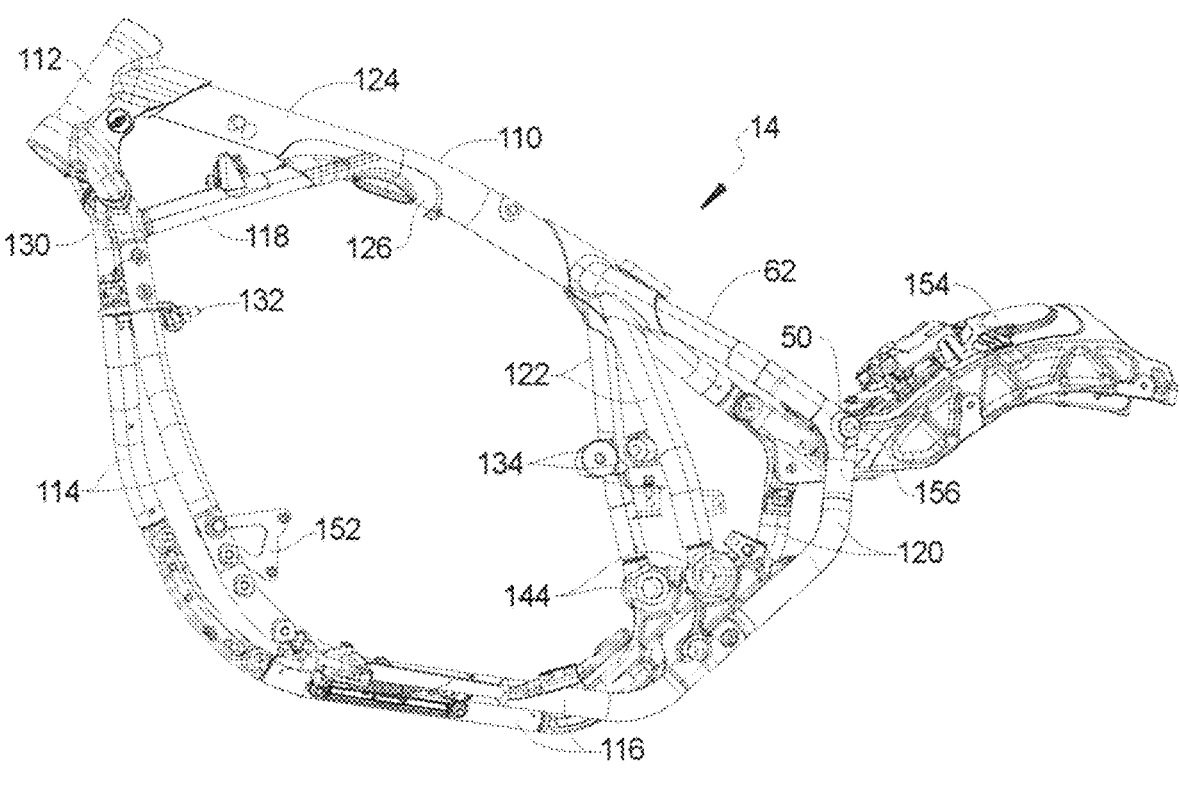
FIG. 2C is a left side perspective view of the frame.
Figure 2D:
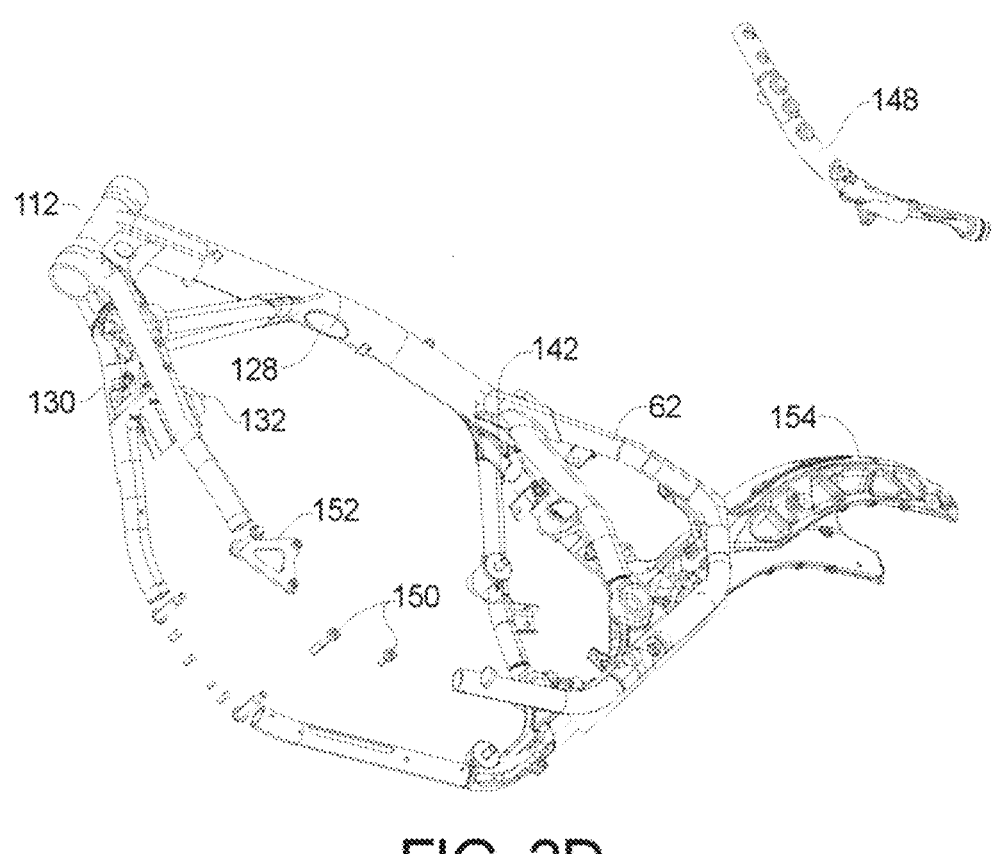
FIG. 2D is a partially expanded left side perspective view of the frame.
Figure 2E:
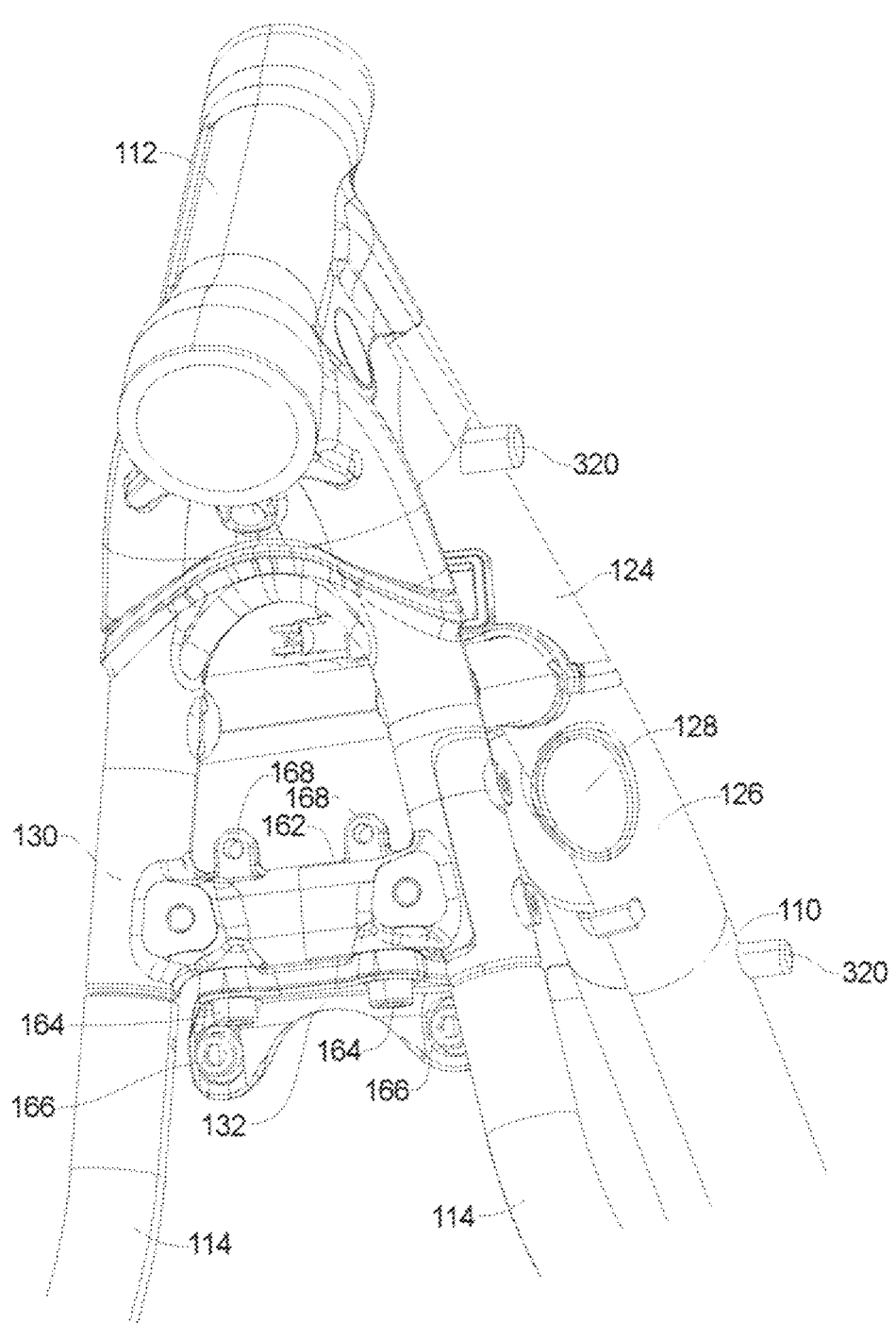
FIG. 2E is an enlarged view of the front engine mount and the head casting 130.

Referring now specifically to FIG. 2E, the head casting 130 is illustrated in further detail coupled to the front rails 114. The front rails 114 are coupled to the head casting 130 to support the front engine mount 132. In particular, the head casting 130 has a cross member 162 that receives fasteners 164 from the underside of the head casting 130. The fasteners 164 are generally upwardly inserted into the head casting 130.

Fasteners 166 couple directly to the engine or engine block. The fasteners 166 may include bushings and threaded fasteners. The cross member 162 of the head casting 130 may also include one or more brake manifold mounts 168. In this example, two brake manifold mounts 168 are set forth.

Figure 3A:
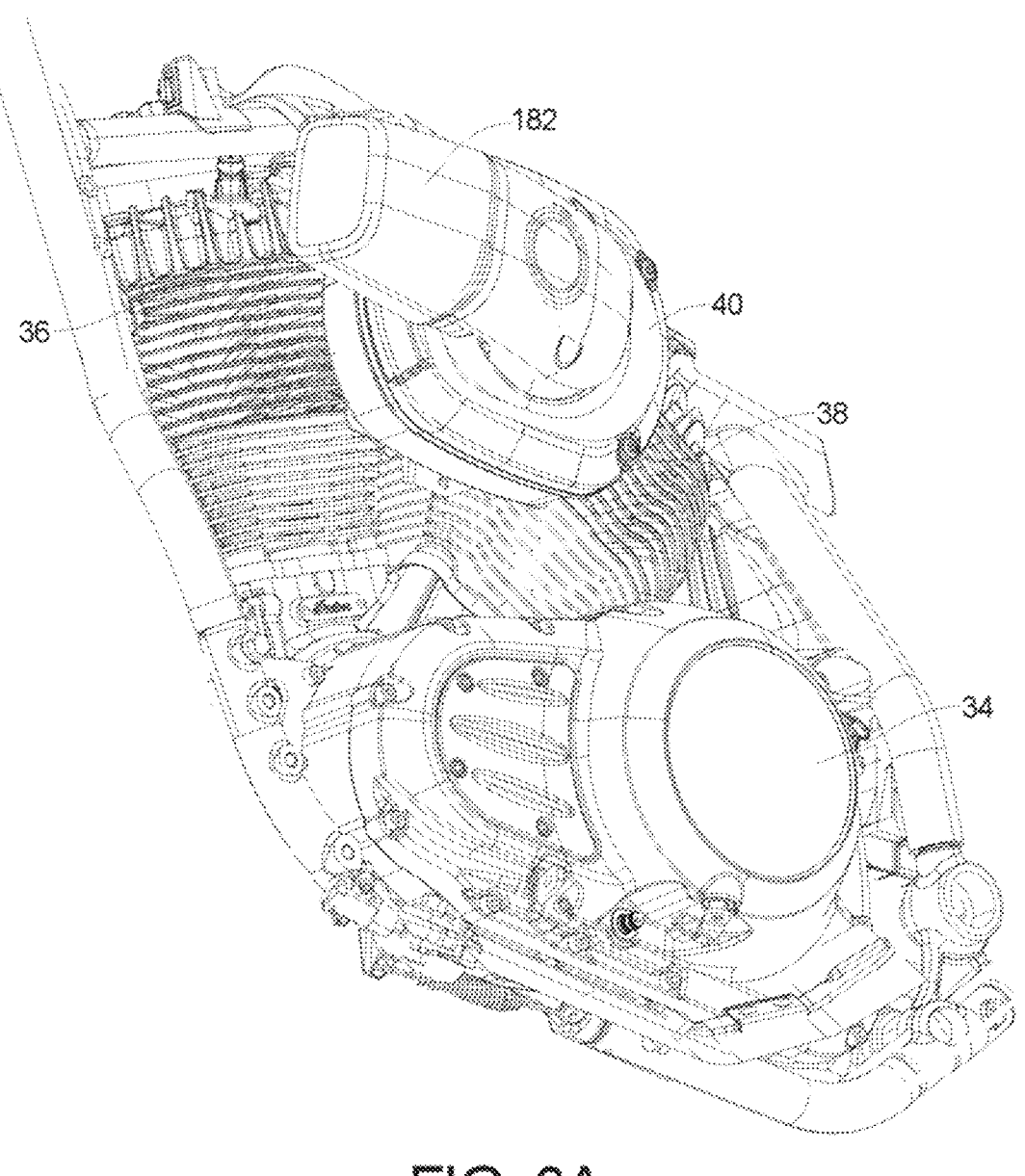
FIG. 3A is a left side view of the engine of the motorcycle.
Figure 3B:
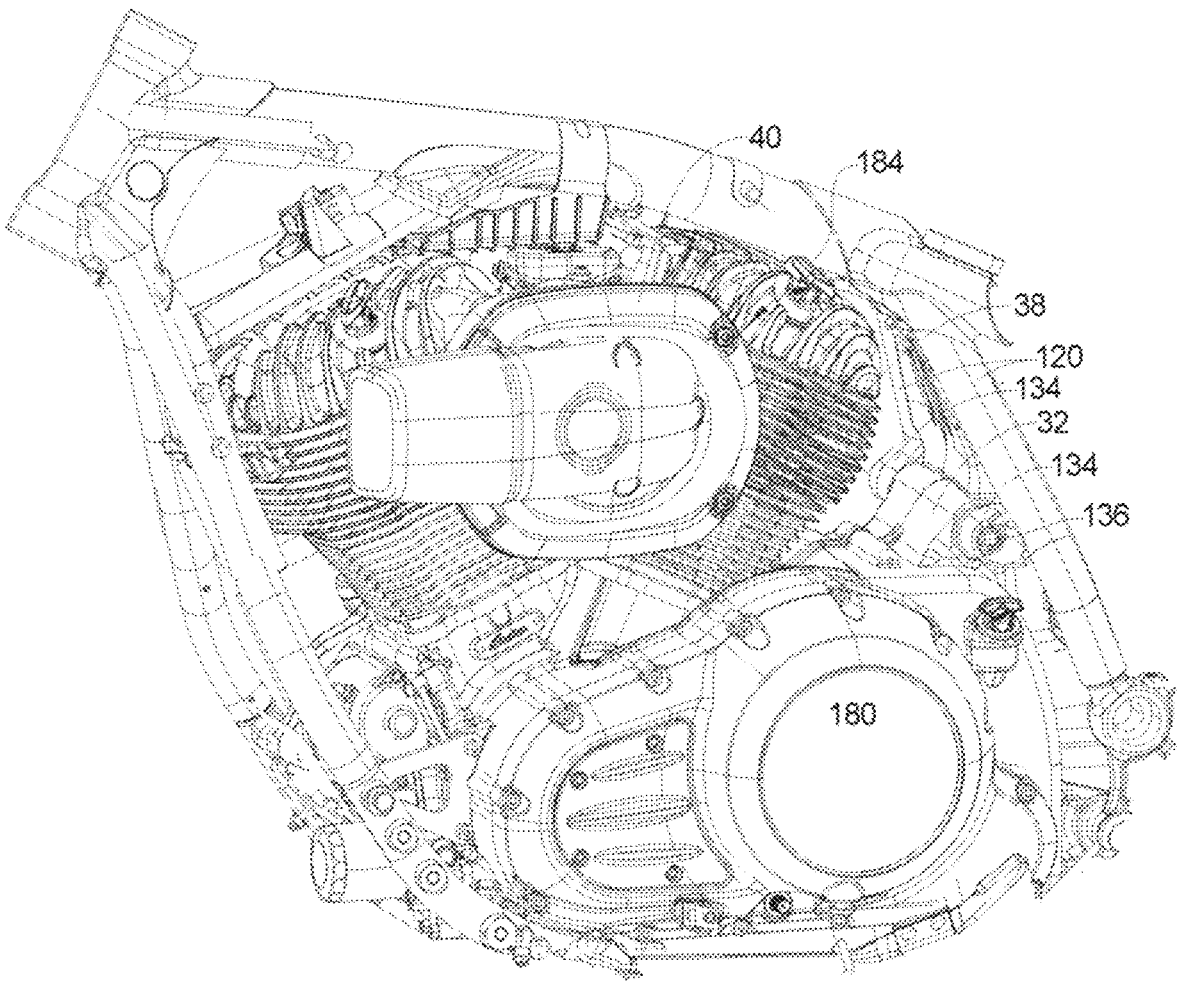
FIG. 3B is an enlarged view of the rear motor mount.

Referring now specifically to FIG. 3B, the rear engine mount 134 is illustrated in further detail. A fastener 136 located at each side of the rear engine mount 134 is coupled directly to the engine 32.

Figure 4A:
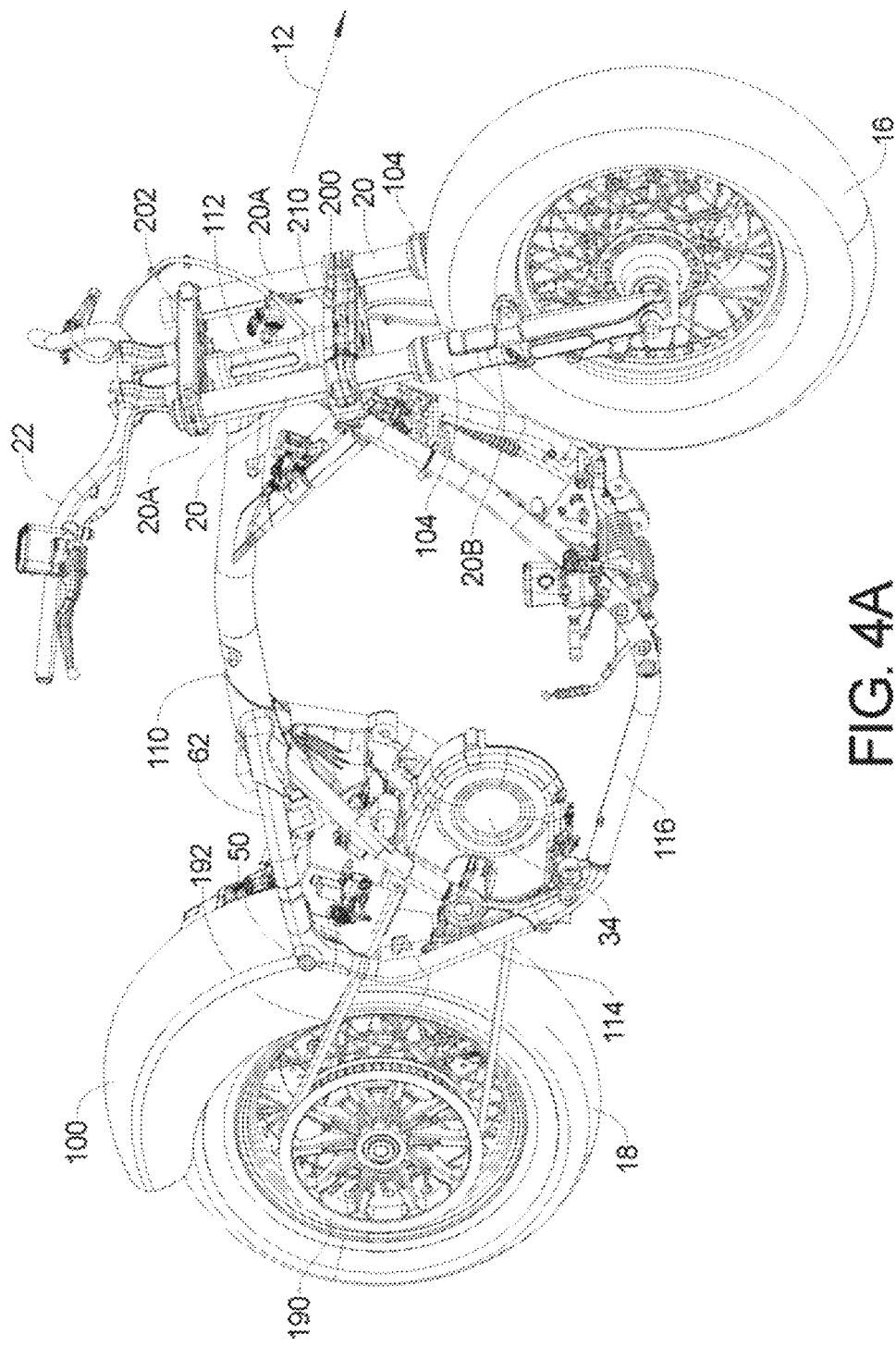
FIG. 4A is a partial right side perspective view of the motorcycle and in particular with some of the components removed.
Figure 4B:
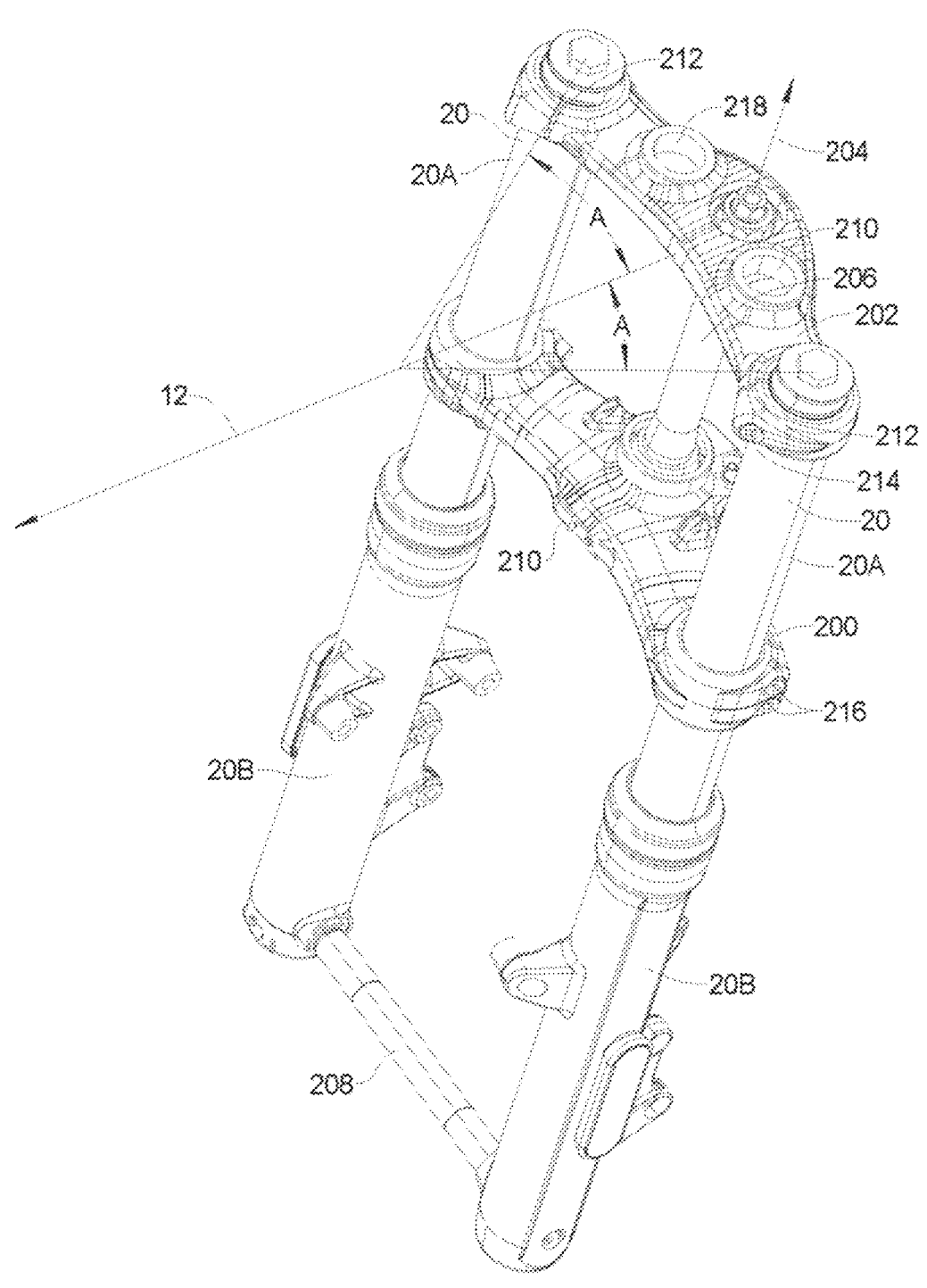
FIG. 4B is an enlarged view of the fork coupled to the triple clamps of FIG. 4A.
Figure 4C:
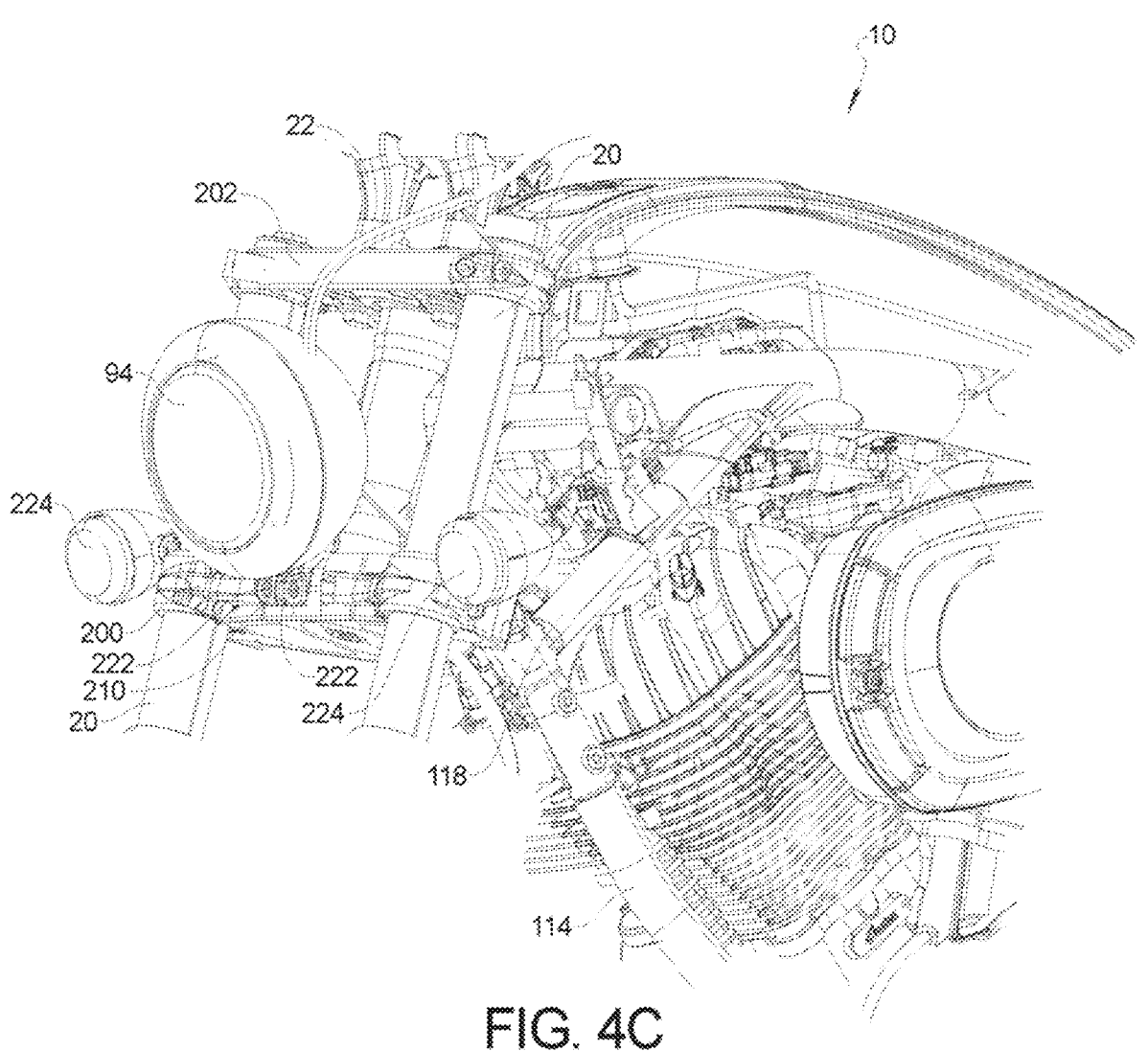
FIG. 4C is a detailed perspective view of the top of the forks relative to the light assembly of the front of the vehicle.
Figure 4D:
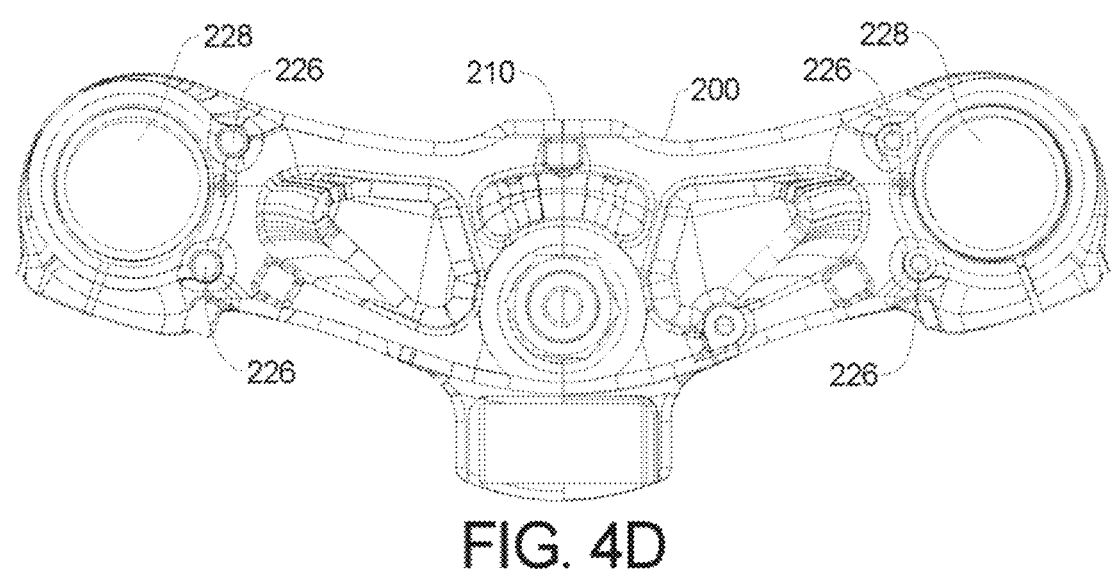
FIG. 4D is a bottom side view of the lower triple clamp.
Figure 4E:
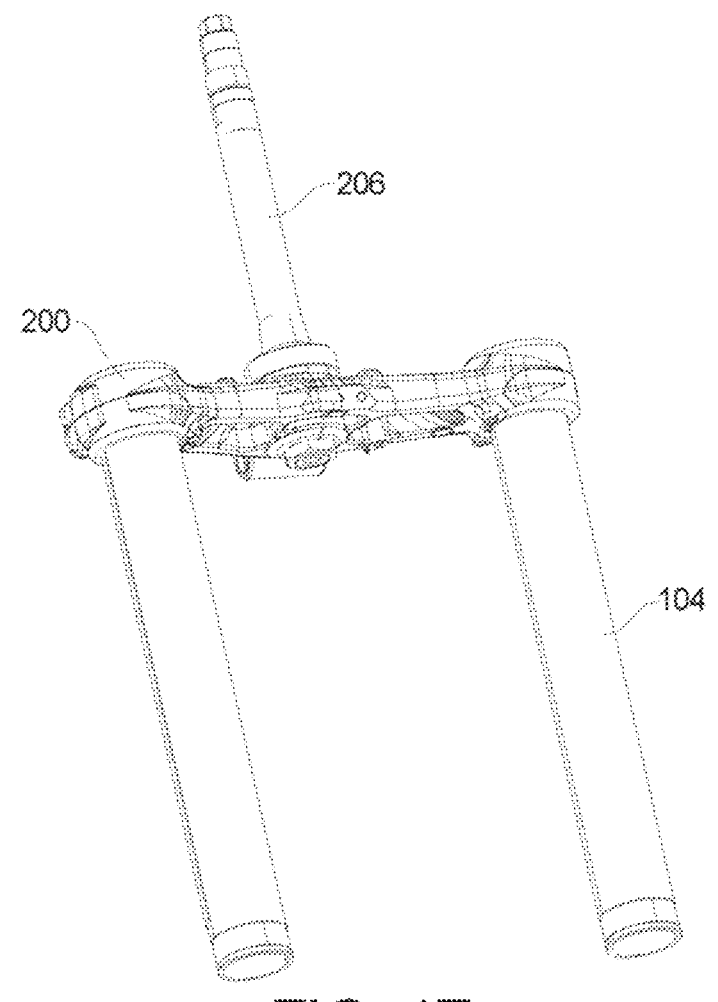
FIG. 4E is a perspective view of the lower triple clamp coupled to the fork covers.
Figure 4I:
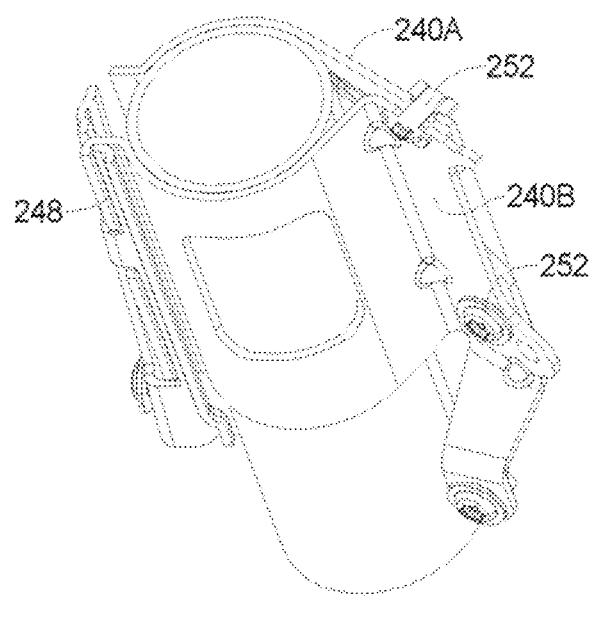
FIG. 4I is a partial perspective view of the top of the fork.
Figure 4J:
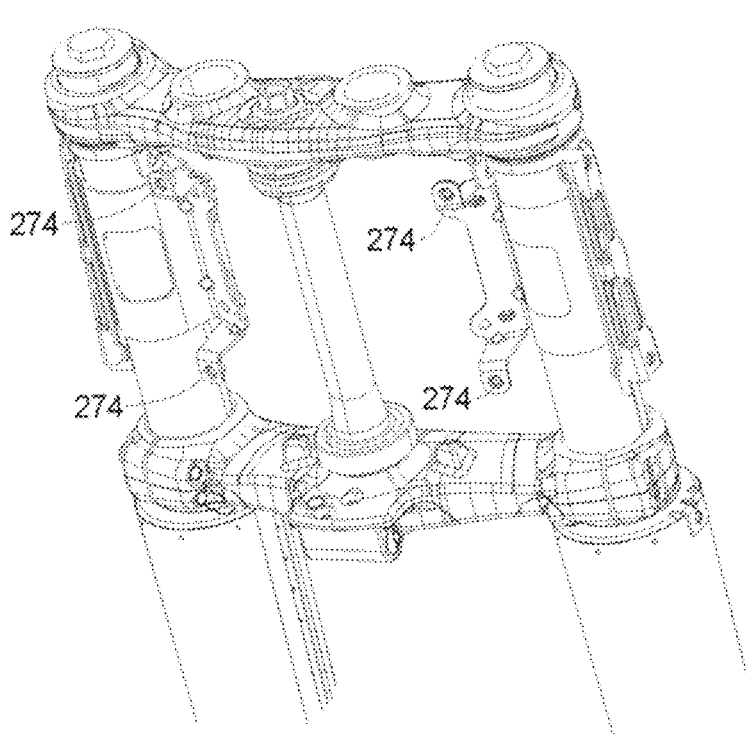
FIG. 4J is a perspective view of the top of the forks with the triple clamps and the clamp of FIG. 4G installed thereto.
Figure 4K:
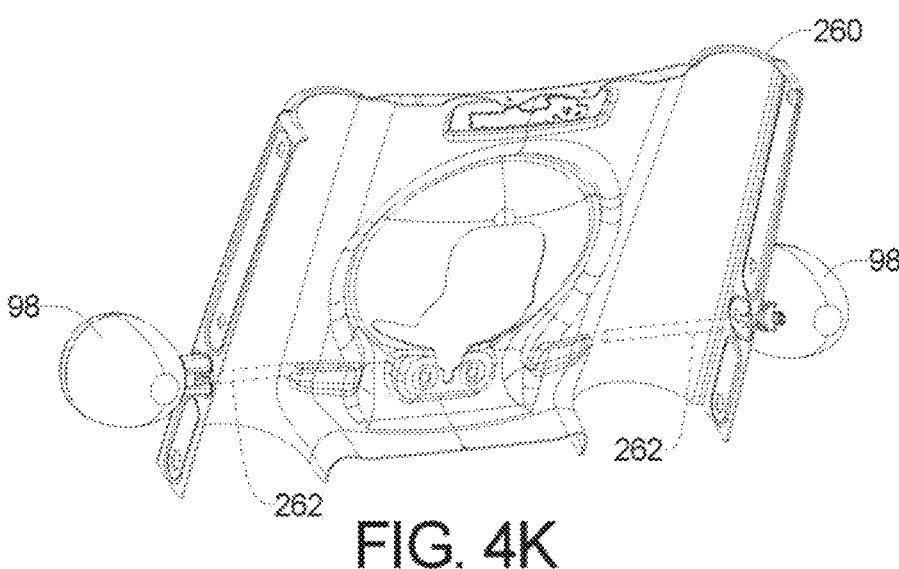
FIG. 4K is a rear view of a nacelle.
Figure 4L:
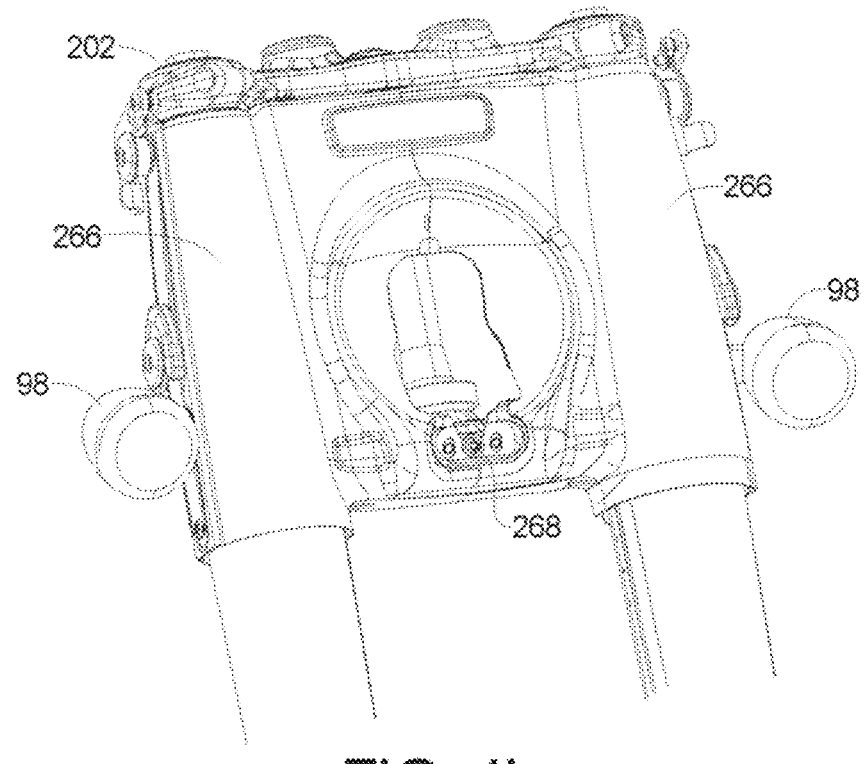
FIG. 4L is a perspective view of the nacelle of FIG. 4K installed at the top of the forks.
Figure 4M:
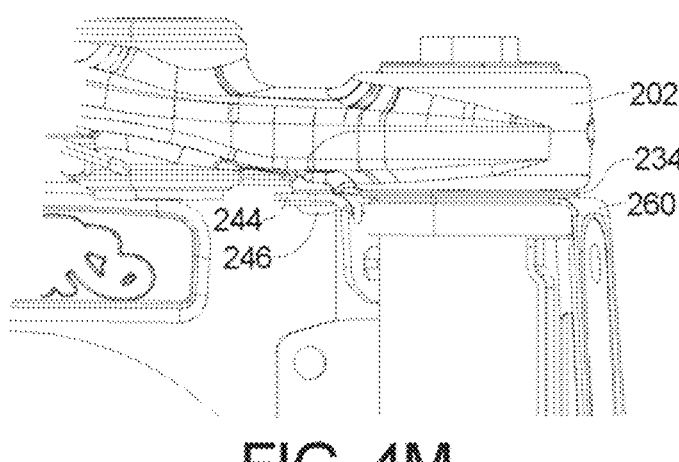
FIG. 4M is an enlarged perspective view of the top of the upper triple clamp relative to the front nacelle and the clamp of FIG. 4G.
Figure 4N:
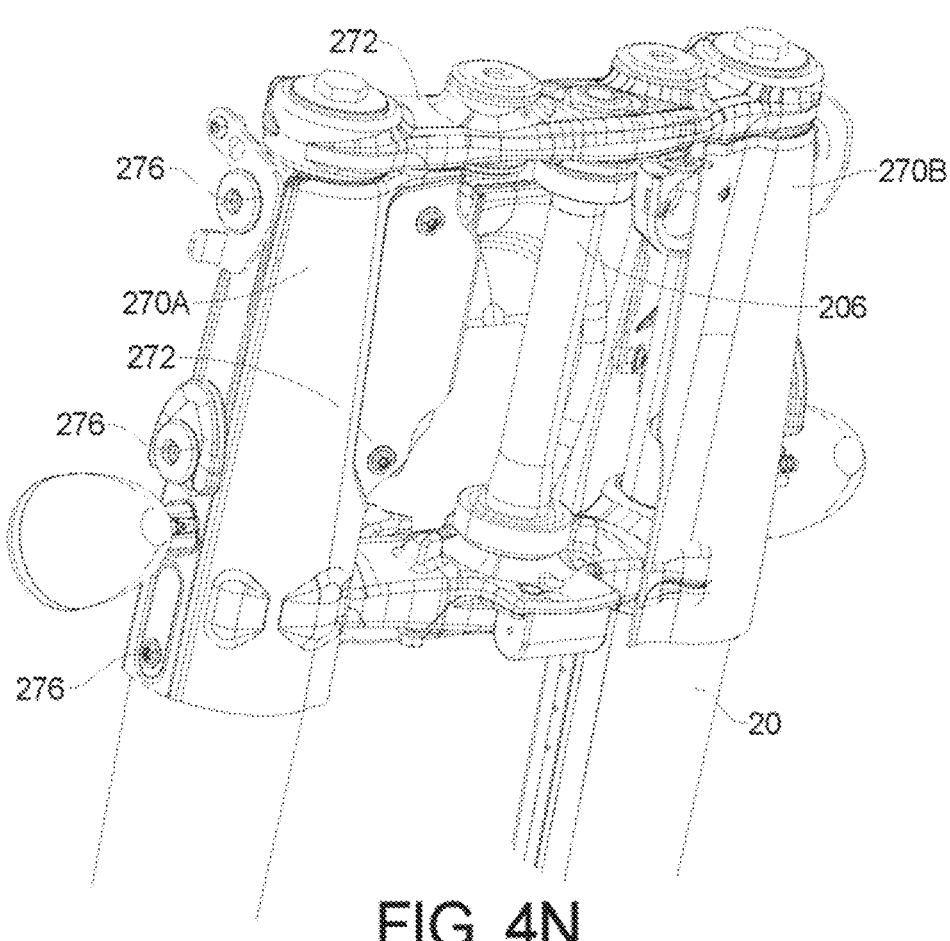
FIG. 4N is a rear side perspective view of the top of the forks with the rear nacelle portions.
Figure 4O:
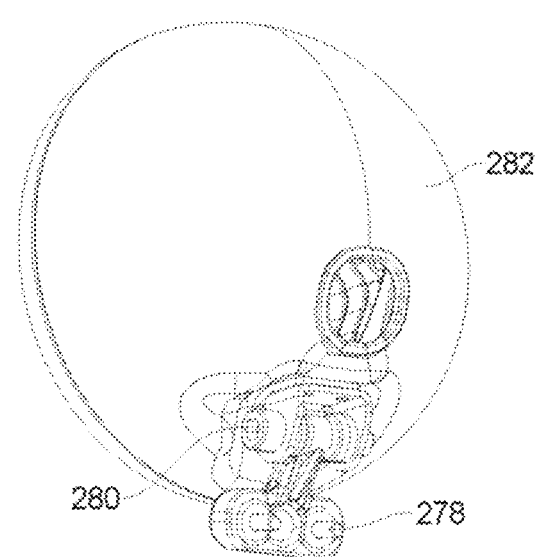
FIG. 4O is a perspective of a headlight bucket.
Figure 4P:
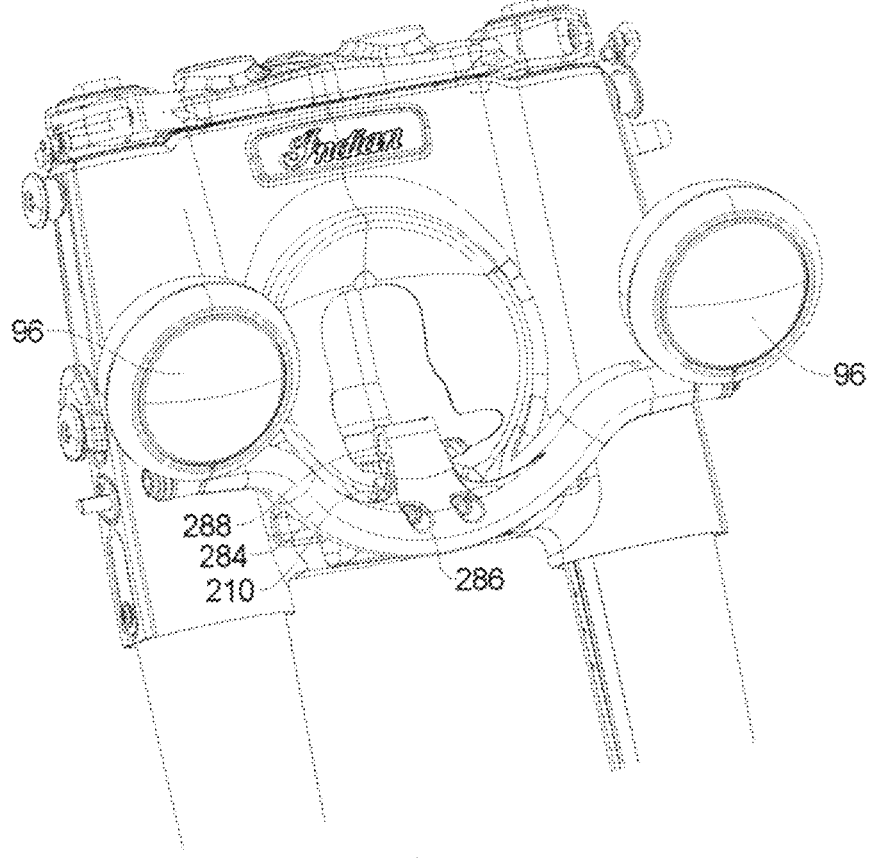
FIG. 4P is a perspective view of fog lamps mounted to the front of the motorcycle.

Referring now to FIGS. 4A-4P, the front end of the motorcycle 10 is illustrated in further detail. However, the rear of the motorcycle 10 is also shown with some components removed to show some of the rear detail. In this example, the transmission 34 is coupled to the rear wheel through a gear 190. The gear 190 is coupled to the transmission 34 through the belt 192. Of course, the rear gear 190 and the belt 192 may be replaced with a sprocket and chain.

The front of the vehicle has the forks 20 as described above. The forks 20 have the fork covers 104 coupled thereto as described above. The forks are held separated by a first triple clamp 200 and a second triple clamp 202. The neck 112 is disposed between the first triple clamp 200, the second triple clamp 202, and the forks 20. The handlebars 22 turn on the axis 204 defined by the neck 112. The neck 112 has a steering stem 206 illustrated best in FIG. 4B. The forks 20 have a fixed portion 20A and an active portion 20B. The active portion 20B may be referred to as a hydraulic chamber.

The lower fork 20B has an axle 208 that extends between the hydraulic chambers. The axle 208 has the front wheel 16 secured thereto.

A component mount 210 is used to secure various components such as a headlight, fog light and/or turn signals. In this example, the component mount 210 has three openings for receiving fasteners for securing the headlight or other components thereto.

The upper triple clamp 202 has a clock opening 212 that is at an angle relative to the longitudinal axis 12 of the vehicle. That is, an angle A which is directed inward at an angle relative to the longitudinal axis 12. A fastener 214 is used to secure the triple clamp 202 to the fork 20 during assembly. Likewise, fasteners 216 are used to secure the lower triple clamp 200 to the forks 20.

Handlebar receivers 218 are disposed through the upper triple clamp 202.

Referring specifically now to FIG. 4C, a detailed front end view of the motorcycle 10 is illustrated. In this example, the headlight 94 is coupled to the component mount 210 using fasteners 222. In this example, two fasteners 222 are illustrated. The turn signals 98 are mounted to the sides of the forks 20.

The method for assembling the front end of the motorcycle is set forth. In FIG. 4D, the lower triple clamp 200 has the fork covers 104 coupled to the lower triple clamp 200 by fasteners 226. The lower triple clamp 200 is then inserted over the fork 20 so that forks 20 are received within the openings 228. The fork cover 104 and triple clamp assembly is illustrated in FIG. 4E. The steering stem 206 is coupled to the lower triple clamp 200 as illustrated in FIG. 4E. The fork tube grommets 230 have a cylindrical portion 232 and a flange 234. The cylindrical portion 232 is placed around the forks 20. The steering stem 206 is also coupled to the lower triple clamp 200. After the grommets 230 are coupled to the forks 20, the upper triple clamp 202 is placed onto the forks 20 to rest against the flange 234 of the grommets 230. The fasteners 214 secure the upper triple clamp to the forks 20. The fasteners 216 secure the lower triple clamp 200 to the forks 20.

Referring now to FIGS. 4G and 4H, a fork tube clamp 240 is illustrated. The tube clamp 240 is illustrated in some motorcycle configurations. The fork tube clamp 240 has a central portion 242 that wraps around the forks 20 between the lower triple clamp 200 and the upper triple clamp 202. The fork tube clamp 240 is used for securing a front nacelle, a windscreen, a turn signal or fog lights or other components as will be described in more detail below. In this example, two fork tube clamps 240 are illustrated. The fork tube clamps 240 have the central portion 242 directly around or at least partially around the upper parts of the fork tubes 20. The fork tube clamp 240 has a securing arm 244 that receives a fastener 246 to secure the fork tube clamp 240 to the upper triple clamp 202. In this example, the fastener 246 is installed along an axis parallel to the fork 20.

The fork tube clamp 240 includes slots 248. The slots 248 may be used for receiving fasteners for the various components coupled thereto. The clamp 240, as is best illustrated in FIGS. 4I and 4J, may comprise two portions 240A and 240B that are fastened together by fasteners 252. In FIG. 4I, the rightmost fork tube clamp 240 is illustrated which when viewed from the front as in FIG. 4J, is on the left side of the figure. The slots 248 also couple the first portion 240A to the second portion 240B. A front portion of a front nacelle 260 is illustrated. The front nacelle 260 affixes to the front of the motorcycle 10. In some configurations, the turn signal 98 may be mounted on a bolt 262 that extends through the side of the front nacelle 260. The bolts 262 affix to the inside of the front nacelle 260. This is illustrated in FIG. 4K. The front nacelle 260 also includes grommets 264. The grommets 264 extend upward from the front nacelle 260 and are inserted in openings within the upper triple clamp 202. As is illustrated in FIG. 4L, the front nacelle 260, with the turn signal 98 coupled thereto, are placed against the fork 20 and slid in an upward motion as illustrated by the arrows 266. This allows the grommets 264 to be seated within openings in the bottom of the upper triple clamp 202. The front nacelle 260 may be coupled to the lower triple clamp 200 with a fastener 268. The fastener 268 is received within the component mount 210 disposed behind the front nacelle 260 in FIG. 4L.

Referring now to FIG. 4M, the front nacelle 260 is disposed so that the flange 234 of the grommet 230 separates the top of the front nacelle 260 from the upper triple clamp 202.

Referring to FIG. 4N, the rear nacelles 270A, 270B are installed. Two fasteners 272 are received in openings 274 as is best illustrated in FIG. 4J. Side fasteners 276 couple the front nacelle 260 to the rear nacelles 270A, 270B. In this example, three fasteners 276 are used. The headlight assembly may then be installed to the component mount 210 with fasteners adjacent to the fasteners 268.

In FIG. 4O, openings 278 align with the component mount 210 to mount the headlight bucket 282 to the component mount 210. An access 280 formed by a fastener allows the headlight bucket 282 to be rotated thereabout. The headlight 94 may therefore then be installed within the headlight bucket 282.

Referring now to FIG. 4P, the component mount 210 is illustrated in another embodiment. In some motorcycle configurations, the use of fog lights 96 are desirable. The fog lights 96 may be mounted to an arm 284. The arm 284 is secured with fasteners 286. The headlight 94 may be secured to a mount 288.

Figure 5A:
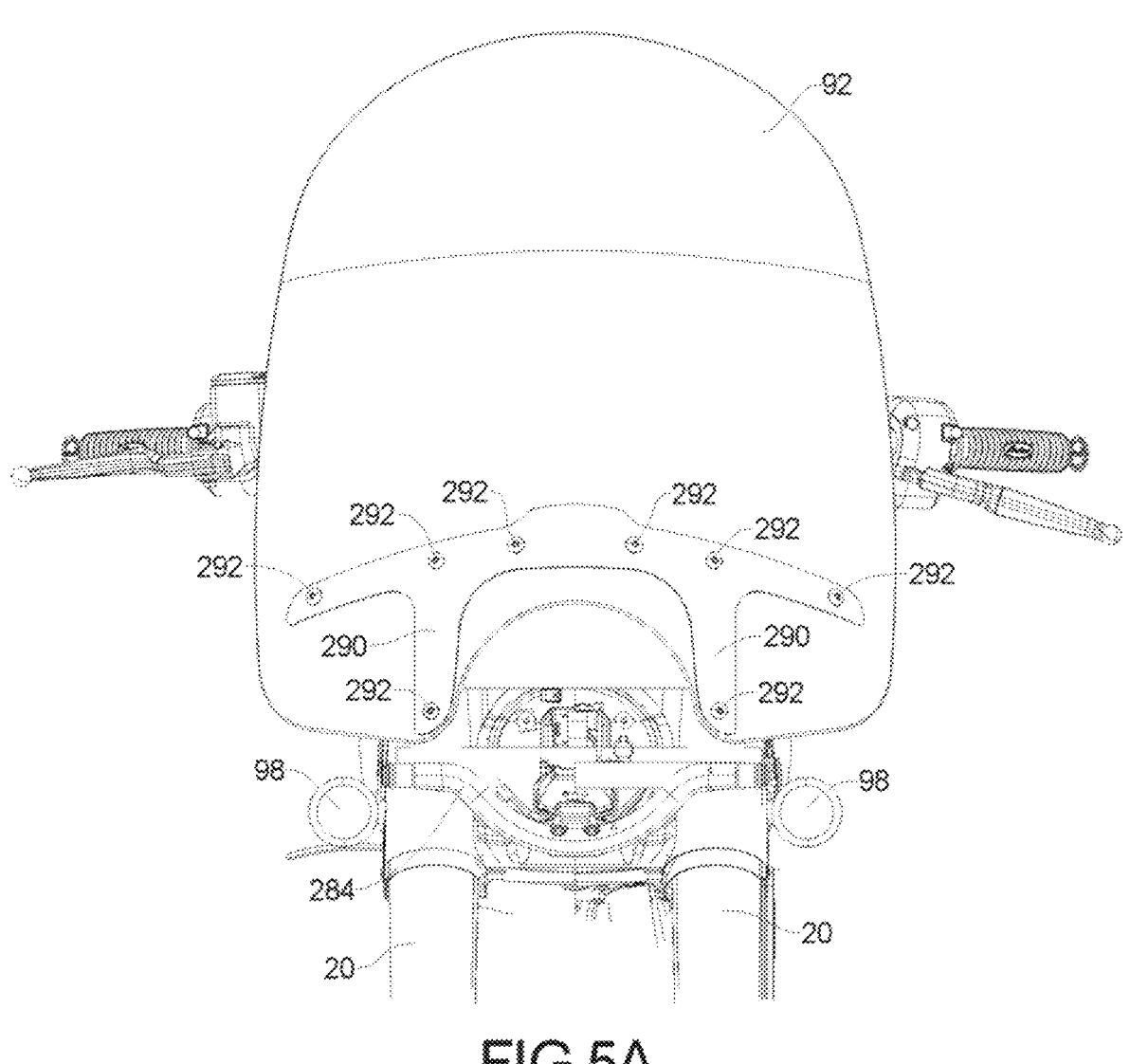
FIG. 5A is a front view of a motorcycle having a windscreen mounted thereto.
Figure 5B:
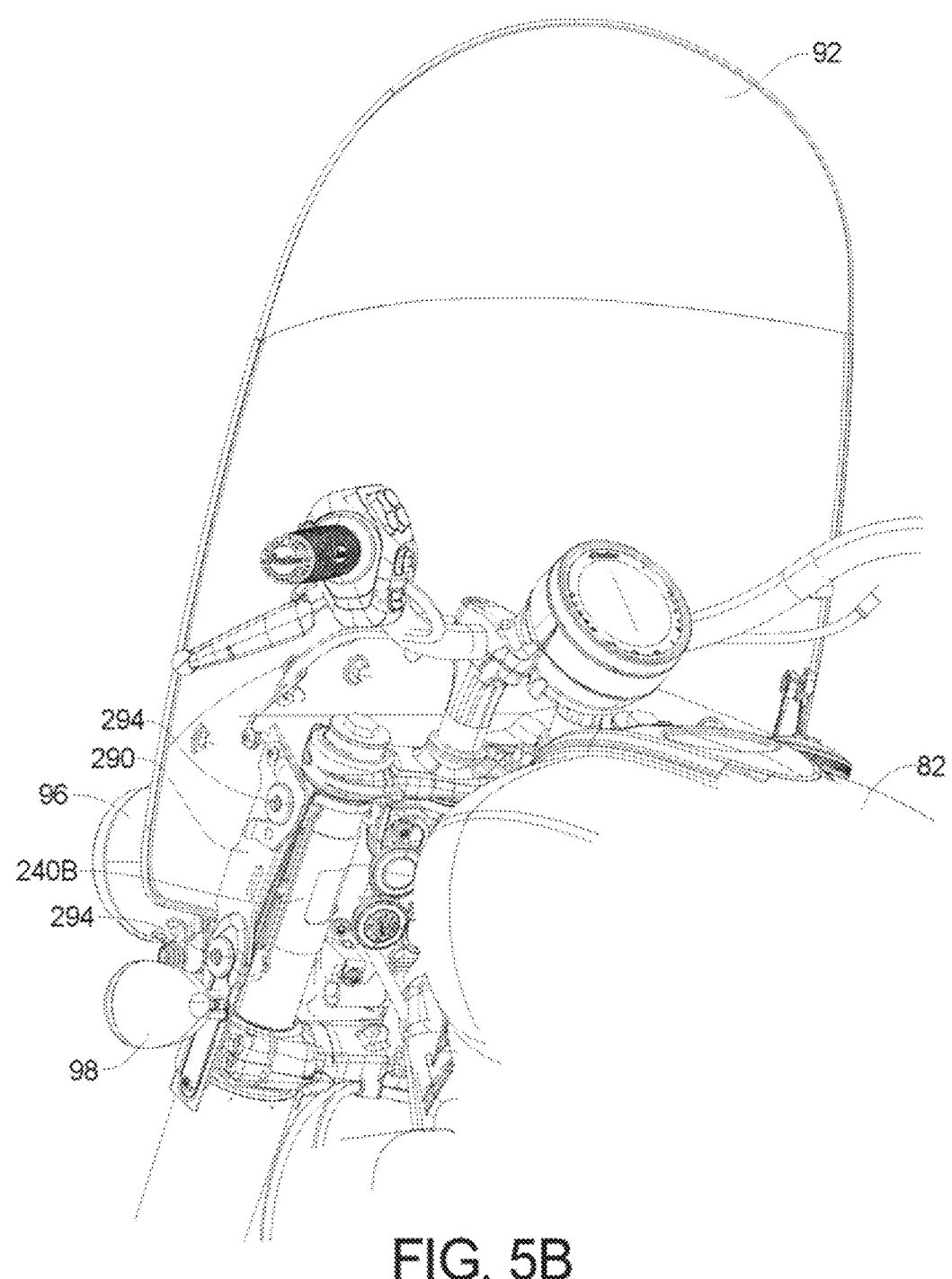
FIG. 5B is a partially perspective front view of the windscreen mount at the front end of the vehicle.

Referring now to FIGS. 5A and 5B, a system for mounting the windscreen 92 is illustrated. The windscreen 92 has a windscreen mounting bracket 290 that is secured to the windscreen 92 by fasteners 292. The windscreen mounting bracket 290 extends in a longitudinal direction. The mounting bracket 290 uses two fasteners 294 that are disposed in a longitudinal direction to mount the windscreen mounting bracket 290 to the slots 248 of the fork tube clamps 240. The windscreen includes two windscreen mounting brackets 290 and therefore four fasteners 294 are used to couple the windscreen to the fork tube clamp 240. It should be noted that in examples with a windscreen, the nacelle is not used. That is, neither the front nacelle 260 nor the rear nacelles 270A, 270B are used.

Figure 6A:
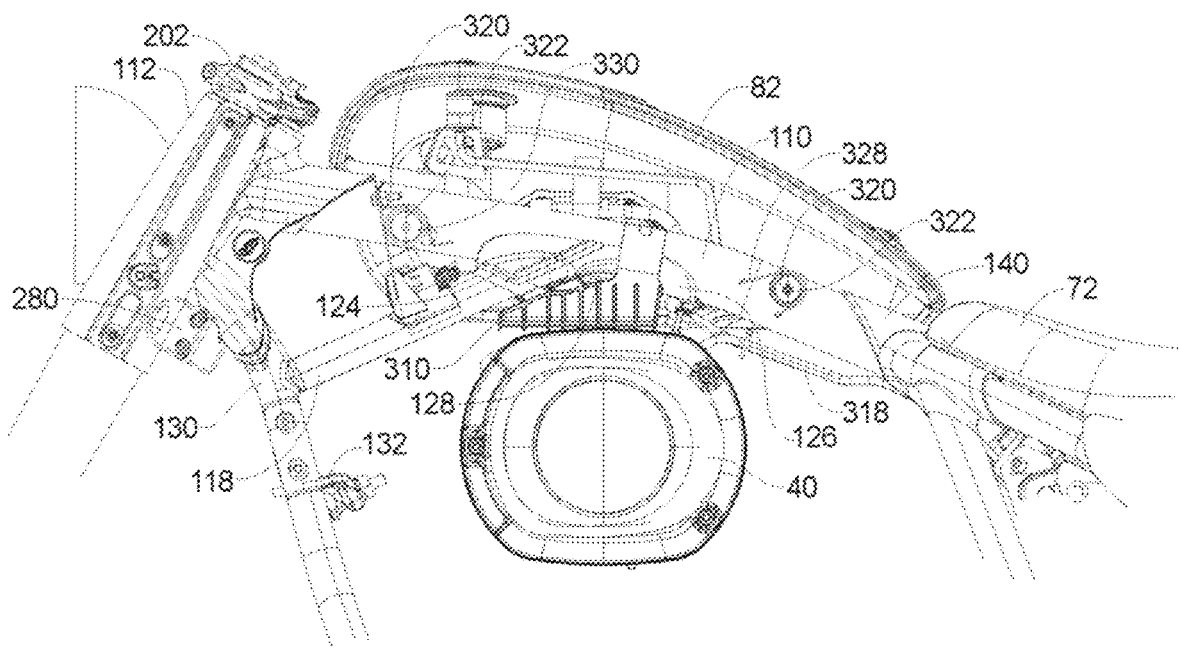
FIG. 6A is cutaway view of the fuel tank 82 mounting system.
Figure 6B:
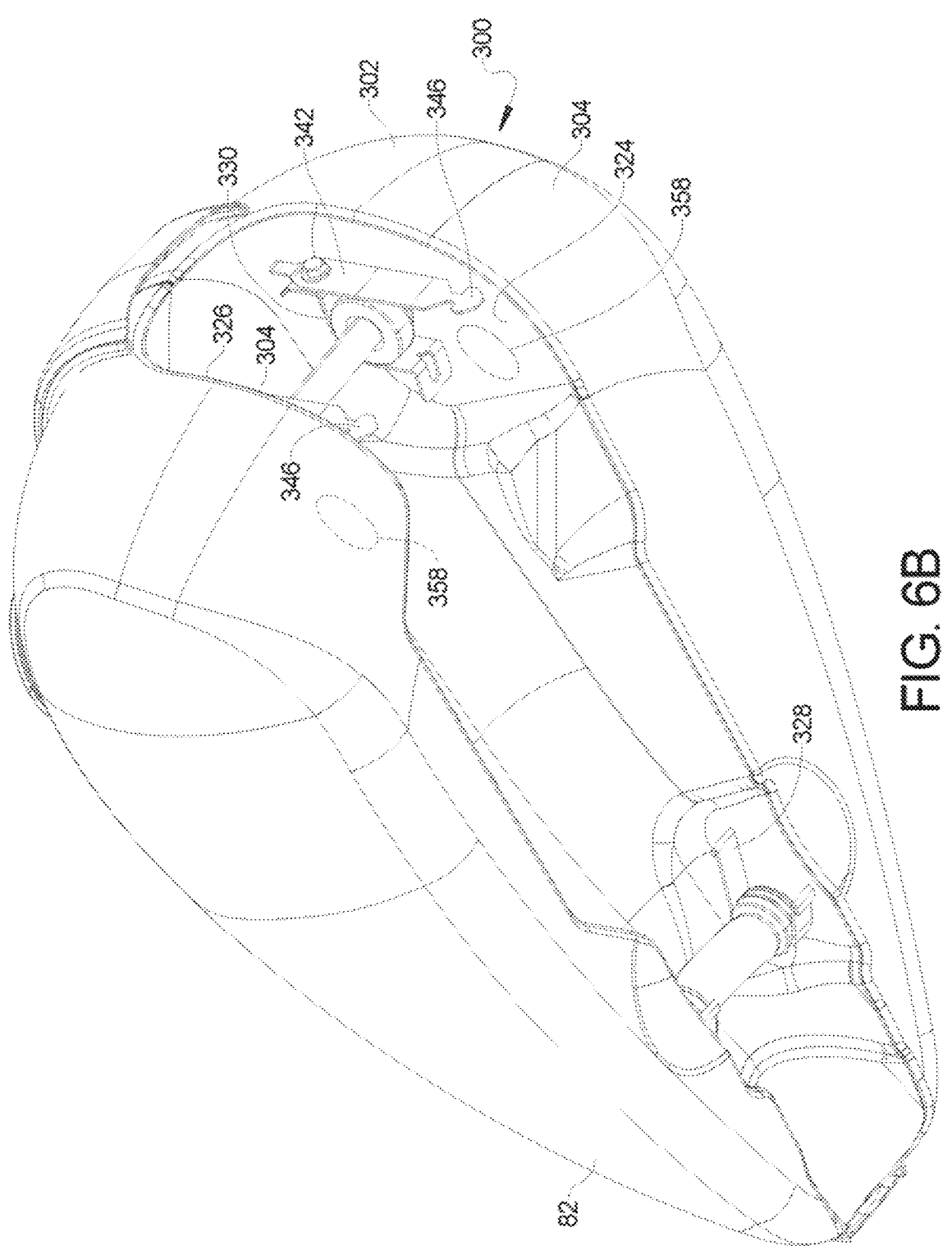
FIG. 6B is a perspective view of the fuel tank illustrating the mounting system therein.

Referring now to FIGS. 6A and 6B, the fuel tank 82 is illustrated relative to the backbone frame member 110. The fuel tank 82 is shaped to define a tunnel 300 therein. In this example, the tunnel 300 has a top portion 302 and a pair of side lobes 304. The top portion 302 is on top of the backbone frame member 110. The side lobes 304 are on either side of the backbone frame member 110 after assembly. The tunnel 300 is generally a U-shaped channel extending longitudinally through the fuel tank 82. As will be described below, no visible fasteners are used for securing the fuel tank 82 to the backbone frame member 110. Referring specifically to FIG. 6A, the tunnel 300 hides the fasteners of the fuel tank 82. Also, the tunnel 300 may be used for hiding fuel lines and other electrical wiring. FIG. 6A shows the opening 128 in the flange 126 of the joiner 124. As mentioned above, the joiner 124 joins the cross members 118 to the backbone frame member 110. The flange 126 preferably forms smooth edges at the opening 128 to prevent the wiring or fuel lines from damage. The opening 128 may be lined with plastic or soft materials. To further maintain the wiring and/or fuel lines close to the underside of the backbone frame member 110, a tray 310 is used. The tray 310 has a tray strap 312 that extends around or partially around the backbone frame member 110. The tray strap 312 secures a tray diverter 314 adjacent to the opening 128. The tray diverter 314 allows the wiring to rest therein. That is, the tray diverter 314 is positioned at a desirable distance to maintain the wiring and/or fuel lines directly adjacent to the backbone frame member 110. The tray diverter 314 also extends adjacent to the cross members 118. Thus, the wiring and/or fuel lines are directly adjacent to the cross members 118. The wiring 316 is directed toward the front end of the vehicle and is in communication with such components as the user display. The wiring 316 may extend into the opening 128 of the flange 126 and travels through the backbone frame member 110 toward the rear joiner 140. An opening 142 in the rear joiner 140, as mentioned above, allow the wiring 316 to exit the backbone frame member 110. The fuel line 318 may also be maintained within the tunnel 300.

Referring now to FIGS. 6A-6F, the backbone frame member 110 includes posts 320 that are fixed to the backbone frame member 110. In this example, four posts 320 are used. The posts 320 are longitudinally spaced apart with two on the right side and two on the left side of the backbone frame member 110. In this example, the rearmost posts are disposed on the backbone frame member 110 between the joiner 124 and the joiner 140. The front posts 320 are disposed between the neck 112 and the cross members 118. However, in a different motorcycle arrangement, the posts may be located in different positions on the frame. The posts 320 may include isolators 322 disposed there around. The isolators 322 may be formed of a compliant material such as rubber to isolate the fuel tank from metal on metal contact. The tunnel 300 has a first inner wall 324 and a second inner wall 326 (which may be a continuous inner wall) that are used for securing stationary brackets therein. In this example, the inner wall 324 and the second inner wall 326 each have a rear stationary bracket 328 that is affixed thereto. Because the components may be metal, the rear stationary brackets 328 may be welded to the fuel tank 82 at the first inner wall 324 and the second inner wall 326. The rear stationary bracket 328 may be C-shaped to receive the rear posts 320 and isolators 322 therein. The rear stationary brackets 328 may have the opening of the "C" shape opened toward the front of the motorcycle 10.

Figures 6C, 6D, 6E, 6F:
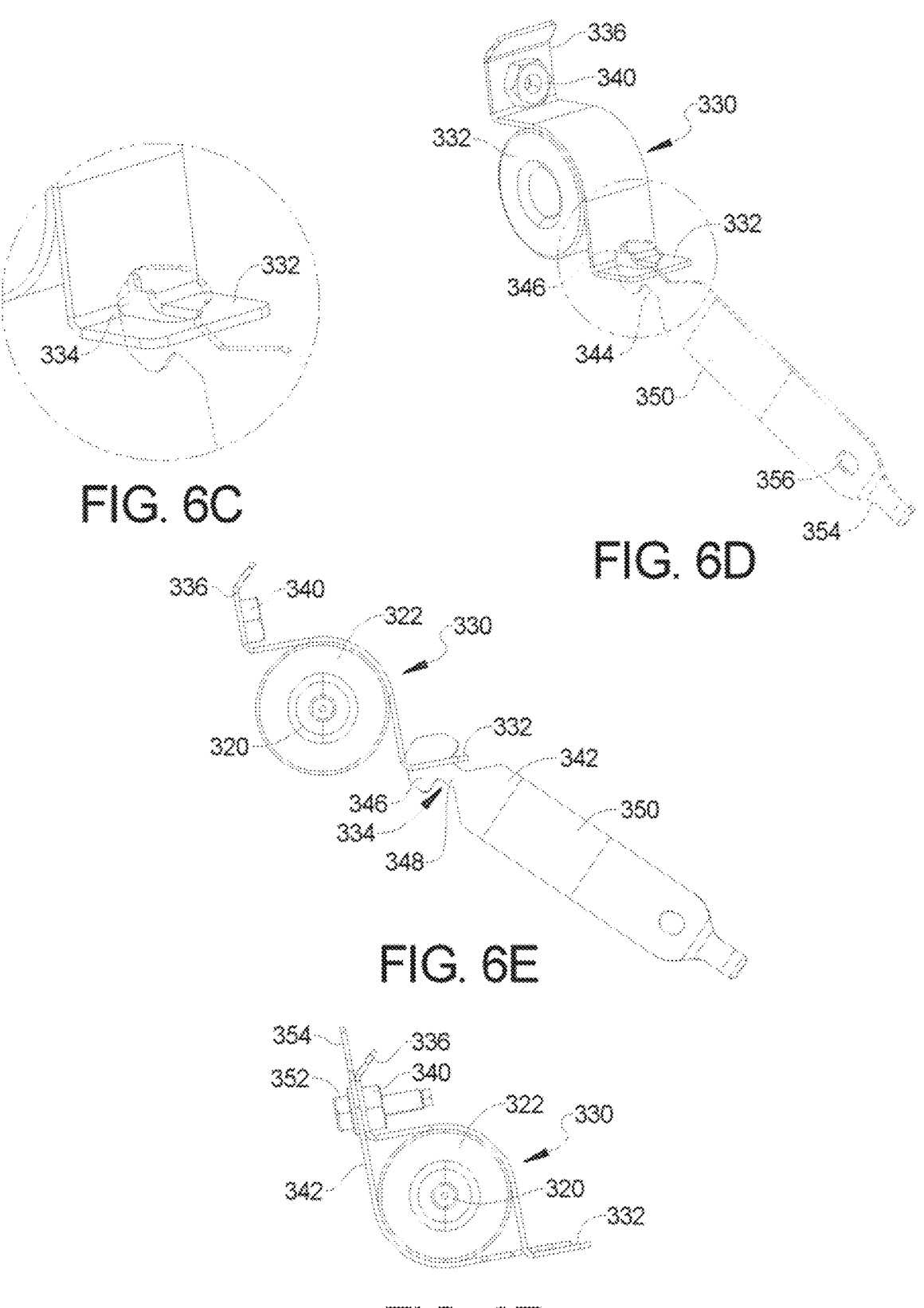
FIGS. 6C-6F are side and perspective views of the fuel tanks mounts.

The first inner wall 324 and the second inner wall 326 may also comprise a front stationary bracket 330. The front stationary brackets 330 may be affixed or welded to the respective inner walls 324. The front stationary bracket 330 has a different shape than the rear stationary bracket 328. The front stationary bracket 330 has a first flange 332 having an opening 334 therein. The opening 334 may be specially shaped as will be described in more detail below. The front stationary bracket 330 may also include a second flange 336 and a central portion 338 that is disposed between the first flange 332 and the second flange 336. The central portion 338 is curved and as illustrated in FIG. 6F, when assembled, is partially around the isolator 322. The second flange 336, in this example, has a nut 340 affixed thereto. The nut 340 may be welded to the second flange 336.

An auxiliary bracket 342 is coupled to the front stationary bracket 330 and extends partially around the posts 320 and the isolator 322. When assembled as illustrated in FIG. 6F, the combination of the auxiliary bracket 342 and the front stationary bracket 330 completely surround the isolator 322 of the post 320. During assembly of the fuel tank 82, the rear portion of the fuel tank is aligned with the posts 320 and the isolators 322. The rear stationary bracket 328 is partially placed around the isolators 322. That is, the isolators 322 and the posts 320 are received within the rear stationary brackets 328 on either side of the backbone frame member 110. For convenience, the fuel tank 82 may be at a greater angle than the assembled angle to allow access for conveniently moving the fuel tank 82 into the proper position. Because the isolator 322 is round and the rear stationary bracket 328 is C-shaped, the fuel tank 82 may be rotated partially around the isolator 322 during the assembly process. The fuel tank is rotated in a counterclockwise position when viewed from the left side of the motorcycle 10 as illustrated in FIG. 6A. The movement of the fuel tank 82 is such that the central portion 338 of the front stationary bracket 330 contacts the front isolators 322. The auxiliary bracket 342 is then installed to the front stationary bracket 330. The process is illustrated in FIGS. 6C-6D.

The auxiliary bracket 342 is elongated and has a first end 344 that has a tab 346. The tab 346 includes a neck 348 that is coupled to a central portion 350.

During the first step of assembly, the tab 346 is inserted into the opening 334. The tab 346 is completely inserted therein and the neck 348 engages the first flange 332. The auxiliary bracket 342 may be rotated within the opening 334 such that the neck 348 engages the first flange 332. The opening 334 may actually extend into a portion of the central portion 338. These steps are best illustrated in FIGS. 6C-6E. The auxiliary bracket 342 is then rotated and secured to the nut 340 by a fastener 352. The fastener 352 may, for example, be a dog point fastener. The auxiliary bracket 342 and the tab 346 lie flush with the first flange 332 when fully assembled as illustrated in FIG. 6F. The auxiliary bracket 342 is preferably flexible and is therefore bent to extend around the isolator 322. A second end 354 of the auxiliary bracket 342 has an opening 356 therethrough. The opening 356 is used to receive the fastener 352. The fasteners 352 is received within the nut 340. In this example, threads may be used to engage the nut 340.

In alternative configurations, different fasteners other than the nut 340 and the fastener 352 may be used. Push pins, tie wraps or the like may be used. It is, however, desirable to have removable fasteners in case the fuel tank or other components of the motorcycle 10 need to be serviced. During the fastening of the fuel tank 82, both sides of the fuel tank 82 are connected to the isolators 322 and the posts 320 in a similar way.

As is best illustrated in FIG. 6B, a magnet 358 may be incorporated into the fuel tank 82 with in each side lobe 304. The magnets 358 may be affixed into the fuel tank 82 directly adjacent to the front stationary bracket 330 and preferably below the stationary bracket 330 so that upon disassembly of the tank, the auxiliary bracket 342 will not fall during disassembly. That is, if the auxiliary bracket 342 is made if a magnetic material and the fuel tank 82 of a non-magnetic material, magnets 358 may be place inside the fuel tank 82 to retain the auxiliary bracket 342 during disassembly. A pocket, fastener or adhesive may retain the magnets 358 in the fuel tank 82. Each side lobe 304 on either side of the backbone frame member 110 and adjacent the tunnel 300 may have a magnet 358. The magnet 358 may also assist during assembly for the same reasons.

Referring now to FIGS. 7A-7D, the rear suspension 44 is illustrated in further detail. As mentioned above, the swing arm 56 is pivotally coupled at the pivot mount 46 using a fastener 144. The swing arm 56 extends rear from the cross rails 122. The swing arm 56 couples the rear wheel thereto using a rear axle 400. The rear axle 400 is secured with a fastening device 402 on each side of the swing arm 56. The shock absorber 48 is mounted to the shock mount 50 using the fastener 156. The second end of the shock absorber 58 is coupled to the extension mount 52 with a knurled stud fastener 406. Details of the knurled stud fastener 406 are provided below. The knurled stud fastener 406 has a nut 408 used to secure the end of the shock absorber 58 against the extension mount 52.

Figure 7A:
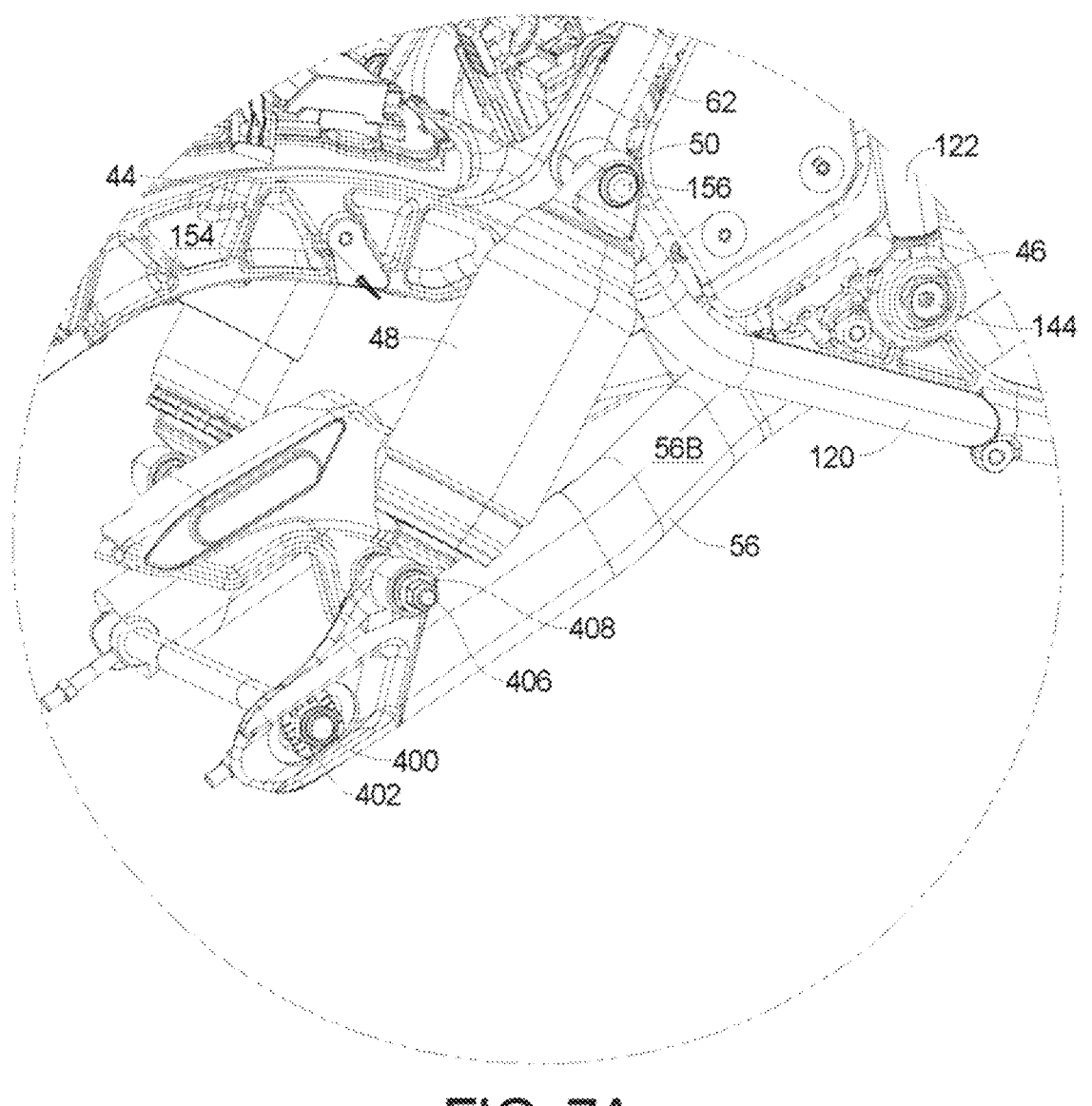
FIG. 7A is a perspective view of the rear suspension on the motorcycle.
Figure 7B:
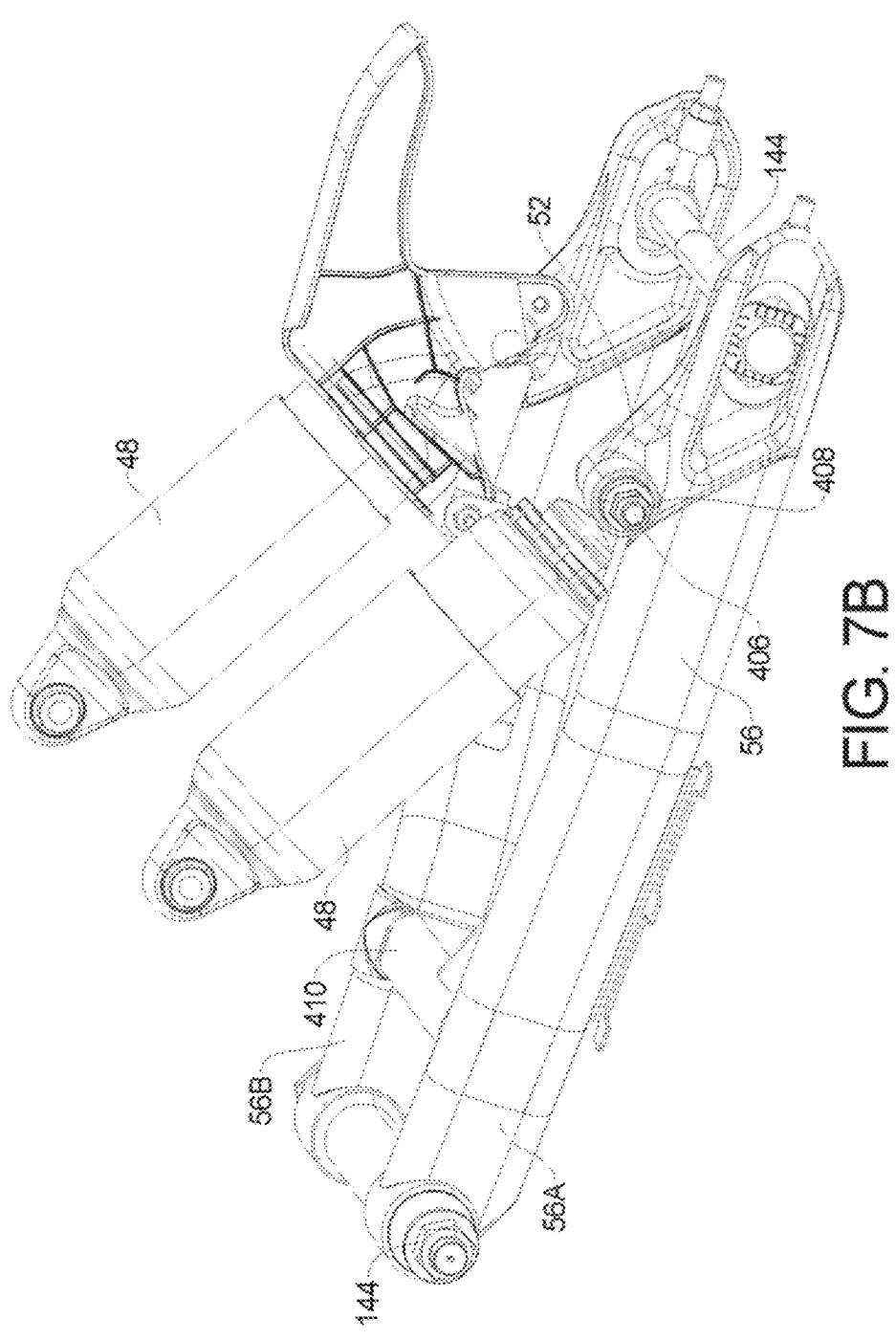
FIG. 7B is a perspective view of the rear suspension of the motorcycle removed from the vehicle for clarity.

The swing arm 56, as best illustrated in FIG. 7B, includes a cross member 410 that extends from a first arm 56A to a second arm 56B of the swing arm 56.

Figure 7C:
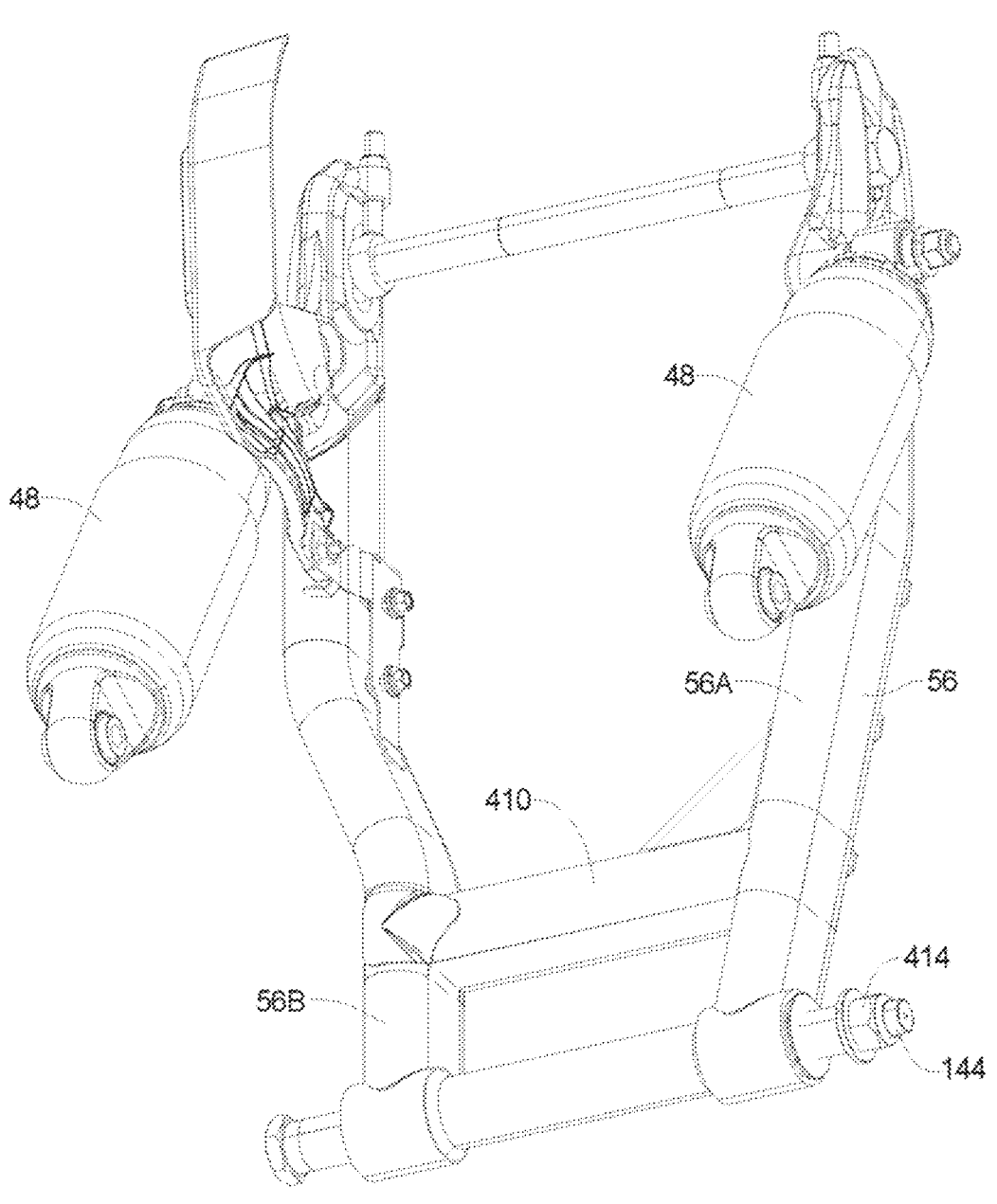
FIG. 7C is a perspective view of the front end of the suspension.

As is best illustrated in FIG. 7C, a nut 414 is coupled of the fastener 144 to secure the fastener 144 to the cross rails 122.

Figure 7D:
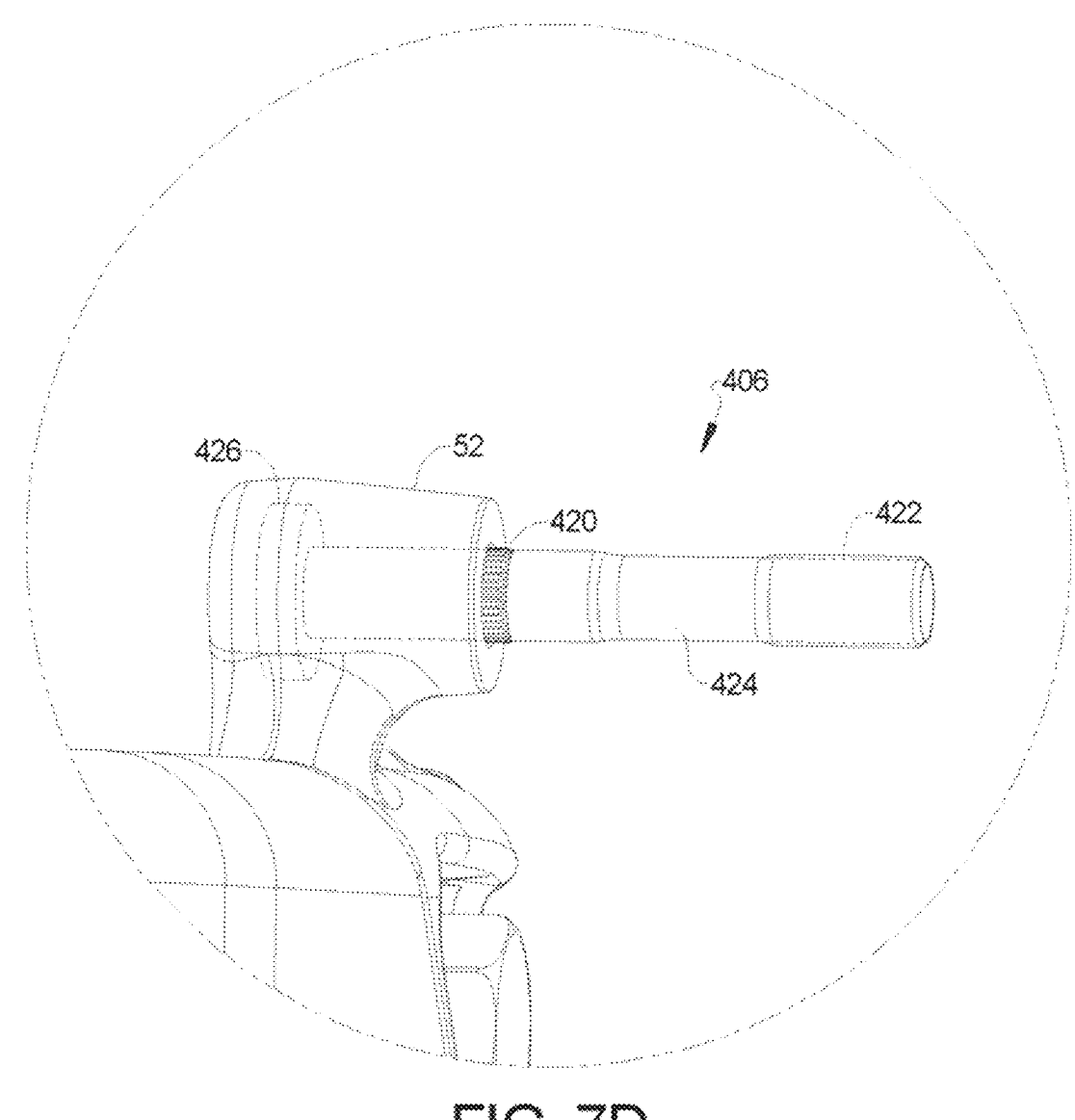
FIG. 7D is an enlarged perspective view of an extension for holding a knurled fastener for coupling to a shock absorber.

Referring now specifically to FIG. 7D, the knurled stud fastener 406 is illustrated in further detail. The knurled stud fastener 406 has a knurled portion 420, a threaded portion 422 and a smooth portion 424. The smooth portion 424 is disposed between the knurled portion 420 and the threaded portion 422. The knurled stud fastener also has a head 426 that is coupled to the extension mount 52. The head 426 may be partially or fully recessed within the extension mount 52.

Figure 8A:
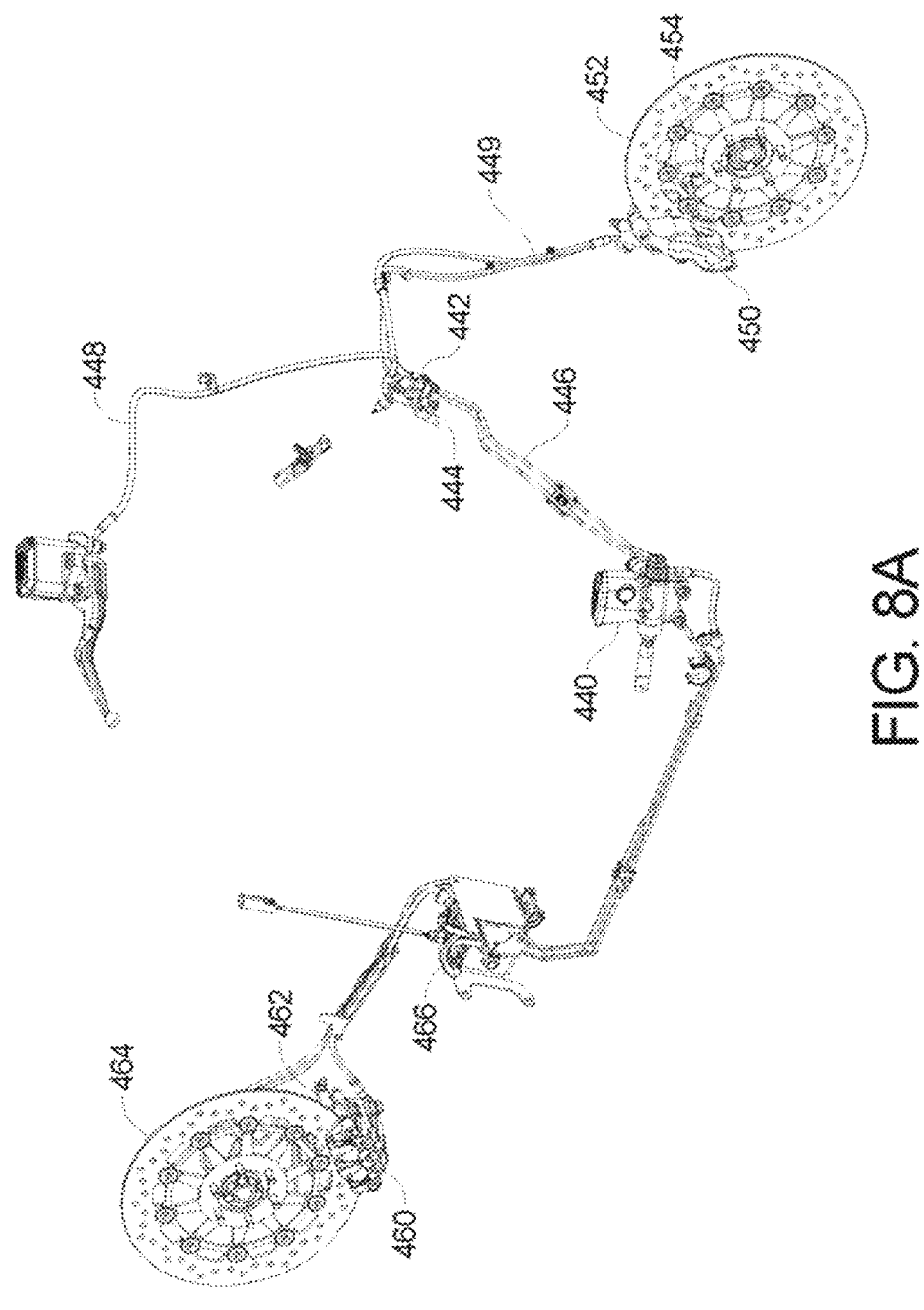
FIG. 8A is a perspective view of the braking system of the motorcycle.
Figure 8B:
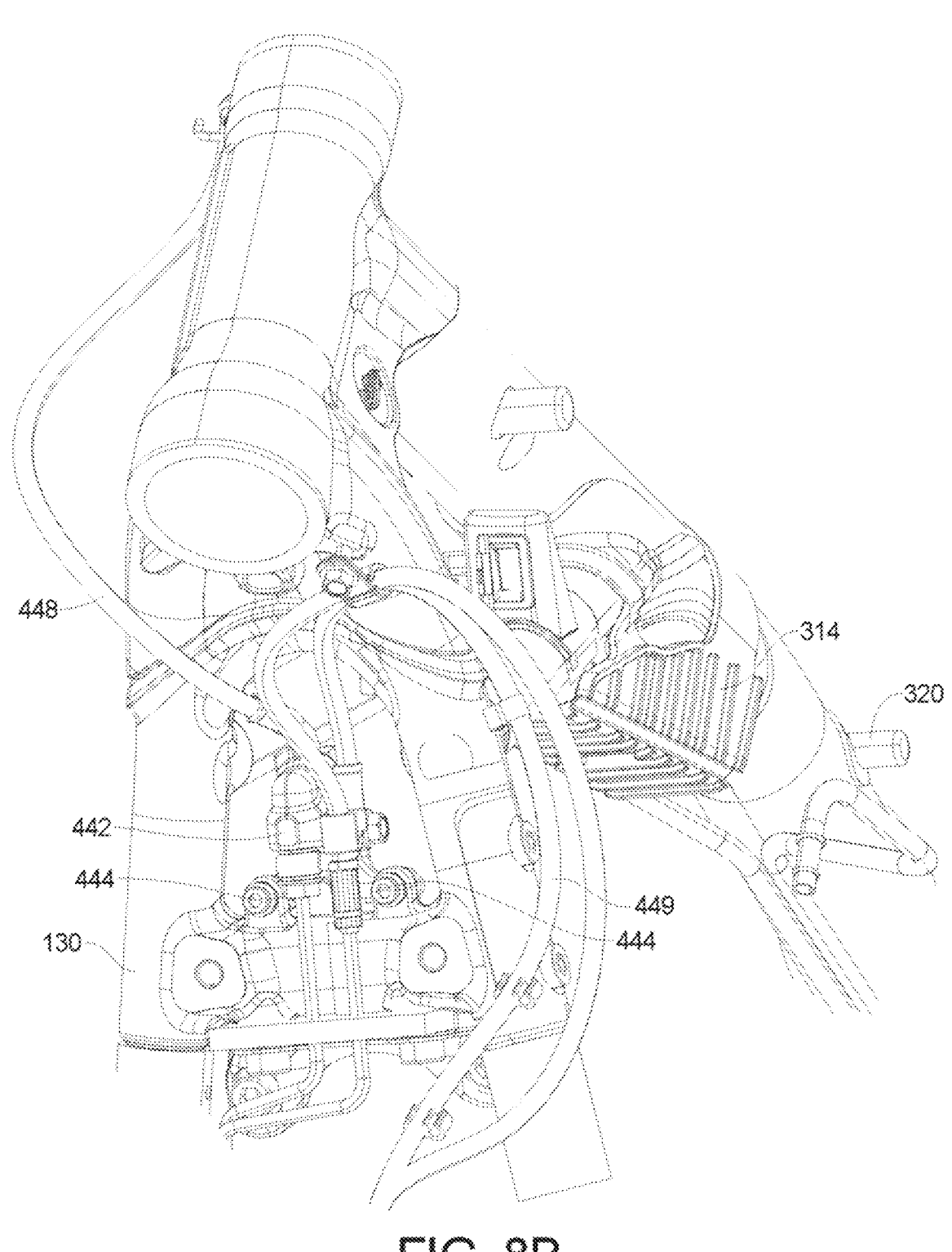
FIG. 8B is an enlarged view of the head casting coupled to a brake manifold.
Figure 8C:
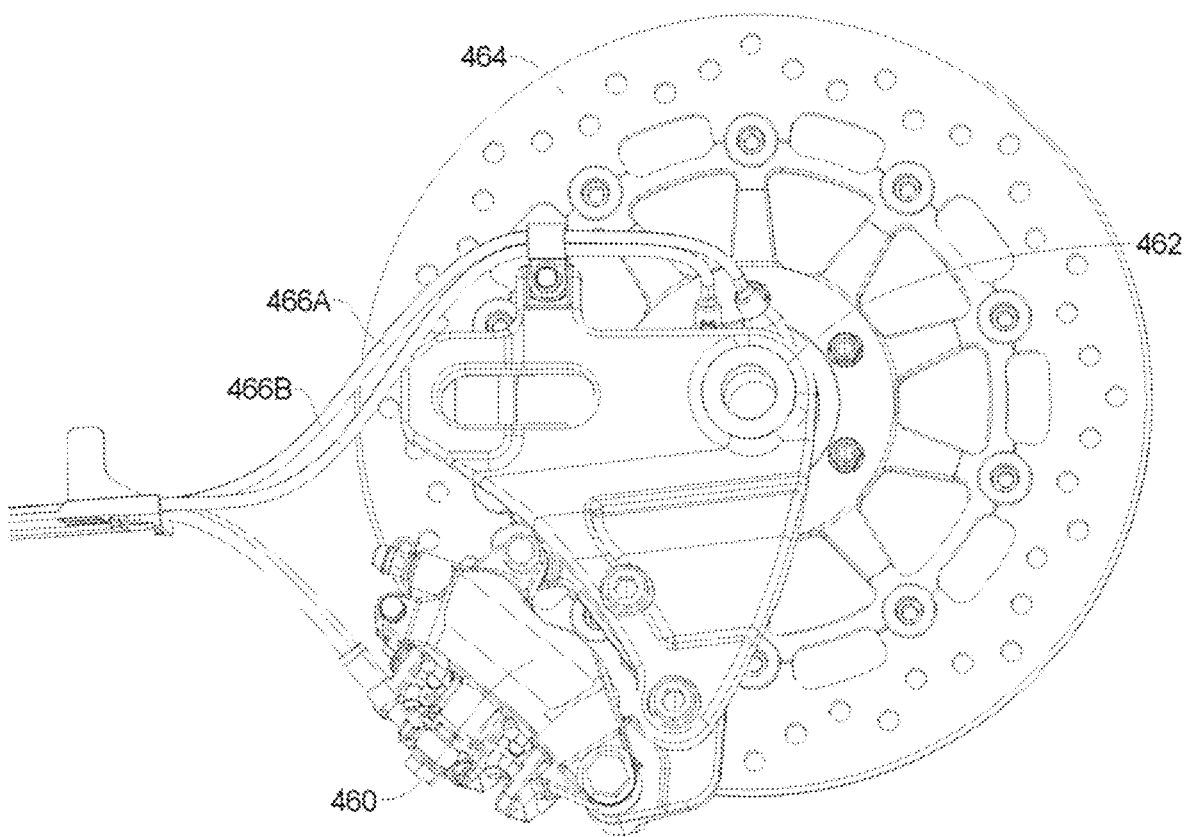
FIG. 8C is a perspective view of the rear anti-lock brake sensor and rear brake caliper.

Referring now to FIGS. 8A-8C, the braking system of the motorcycle 10 is set forth. In this example, a master cylinder 440 that is in fluid communication with the brake manifold 442. The brake manifold 442 is coupled to the head casting 130 and specifically to the brake manifold mount 168 illustrated in FIG. 2E. Fasteners 444 couple the master cylinder 440 to the brake manifold mount 168. The master cylinder 440 is coupled to the brake manifold 442 through brake lines 446. The brake line 448 is coupled to the hand brake and the top of the manifold 442. The bottom of the brake manifold 442 may be coupled to the front brake caliper 450 through brake line 449 in a non-abs system or to an ABS controller 466 in an ABS system. The front brake caliper 450 is directly adjacent to a front brake disk 452. A front anti-lock brake sensor 454 is disposed on the other side of the front brake disk 452. Handlebars 22 may be changed to customize the motorcycle 10. Typically, brake line replacement is a multi-hour task. By providing the brake manifold 442 in this location, only a short piece of brake line 448 needs to be replace when replacing the handlebars 22. Thus, the time to customize is reduced.

The rear portion of the motorcycle 10 includes a rear brake caliper 460 and a rear anti-lock brake sensor assembly 462. A rear disk 464 is disposed adjacent to the rear brake caliper 460.

The anti-lock brake system of the motorcycle 10 includes the anti-lock brake system controller 466. The controller 466 controls the actuation of the rear brake caliper 460 and the front caliper 450.

Figure 8D:
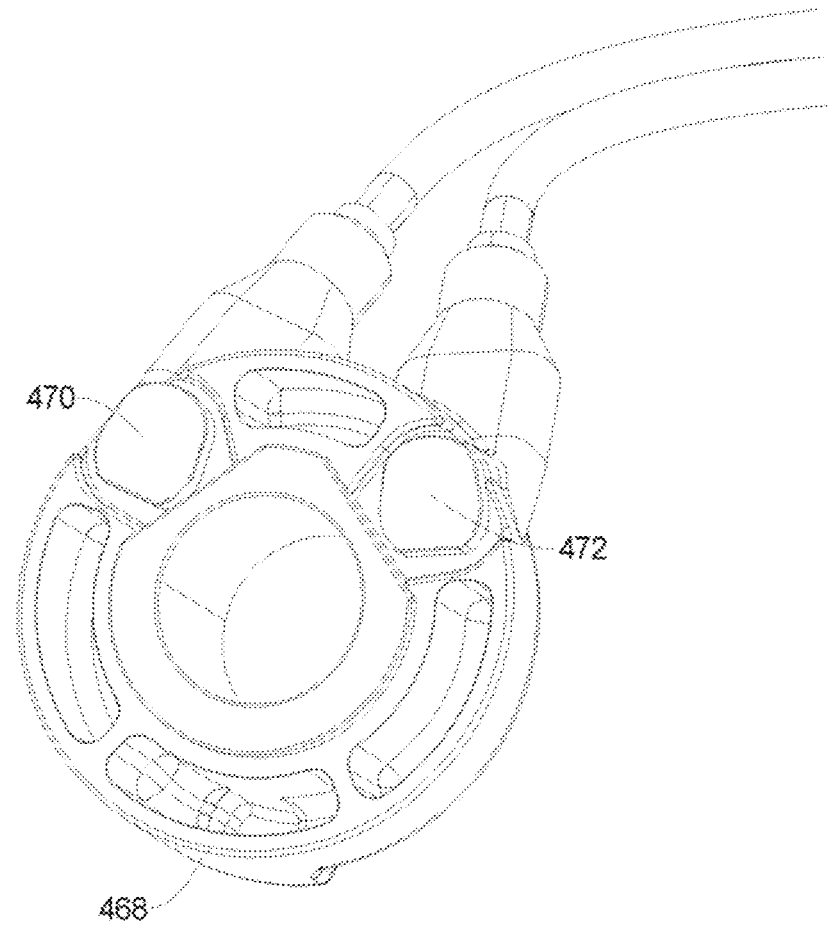
FIG. 8D is a side view of an anti-lock brake sensor housing.

The rear ABS sensor assembly 462 is best illustrated in FIG. 8D. The rear ABS sensor has two set of communication wires 466A and 466B.

Referring now to FIG. 8D, details of the rear ABS sensor assembly 462 is set forth in further detail. The rear ABS sensor assembly 462 has a housing 468 that is circular in shape and is disposed at the center of the rear wheel/rear brake disk 464. The housing holds two ABS sensors 470 and 472. The ABS sensors 470 and 472 may have different configurations thus one may have two wires for communication, one may have tree wires for communication or both could be the same. Although the rear wheel 18 is shown for the ABS sensor housing 468, the front wheel 16 may have the housing 468 as well.

Figure 9A:
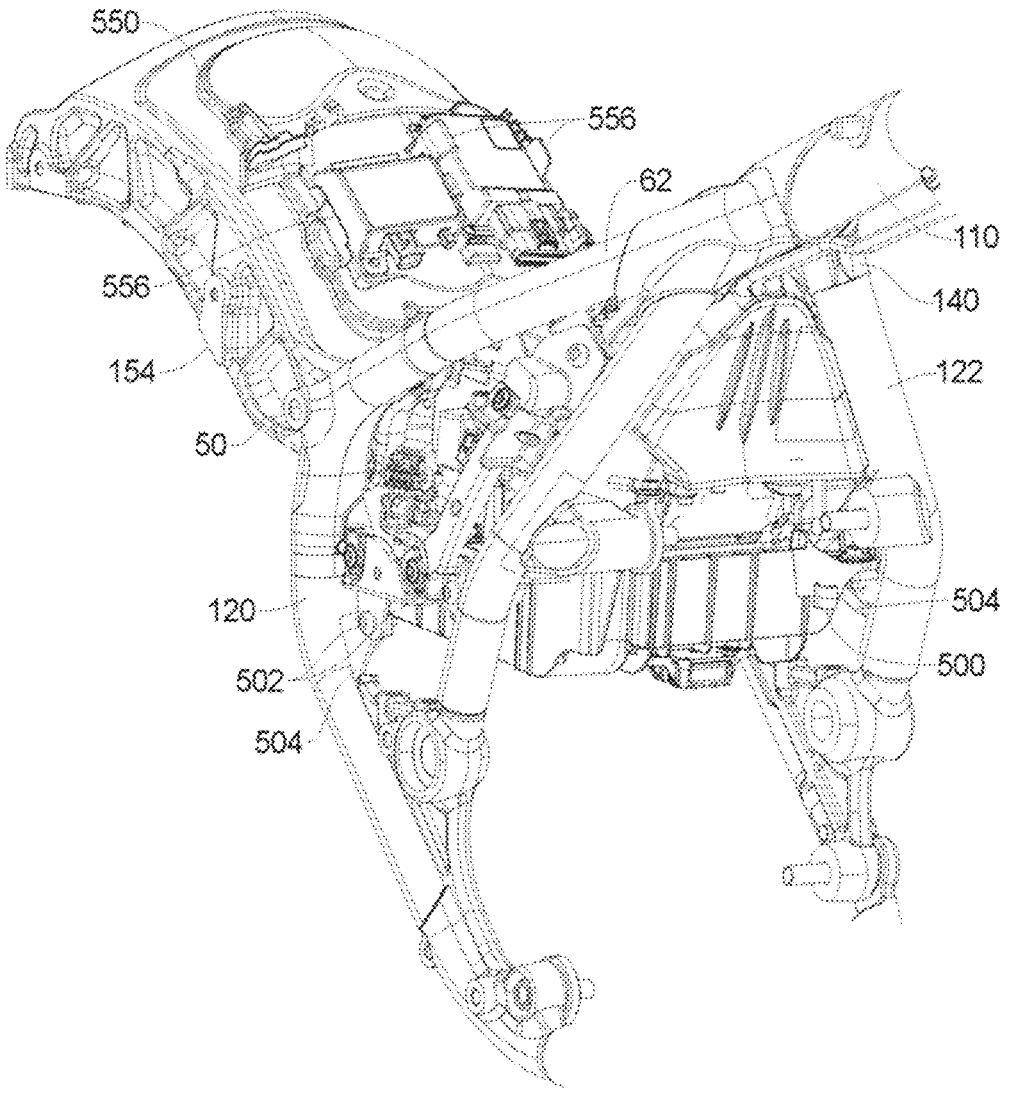
FIG. 9A is a perspective view of an electrical box mounted under the seat of the vehicle.

Referring now to FIGS. 9A, the rear portion of the vehicle is illustrated in greater detail. In this example, the seat has been removed and an electrical box 500 is coupled between the cross rails 122 and the lower rear rails 120. The electrical box 500 may be formed of a composite material such as plastic. The electrical box 500 is mounted by way of fasteners 502 to brackets 504 that extend from the respective frame members.

Figure 9B:
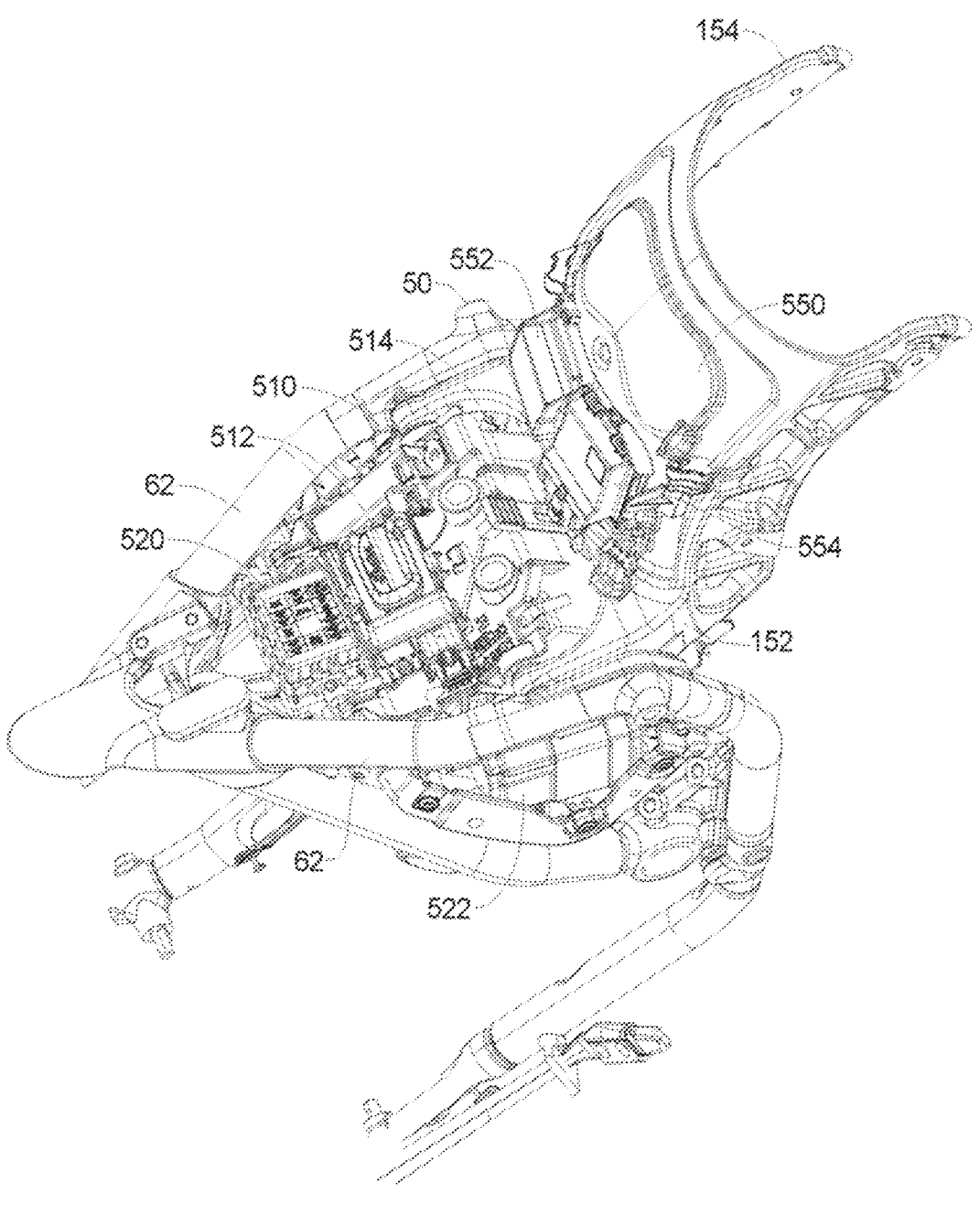
FIG. 9B is a perspective view of the electrical box and a rear fender assembly.
Figure 9C:
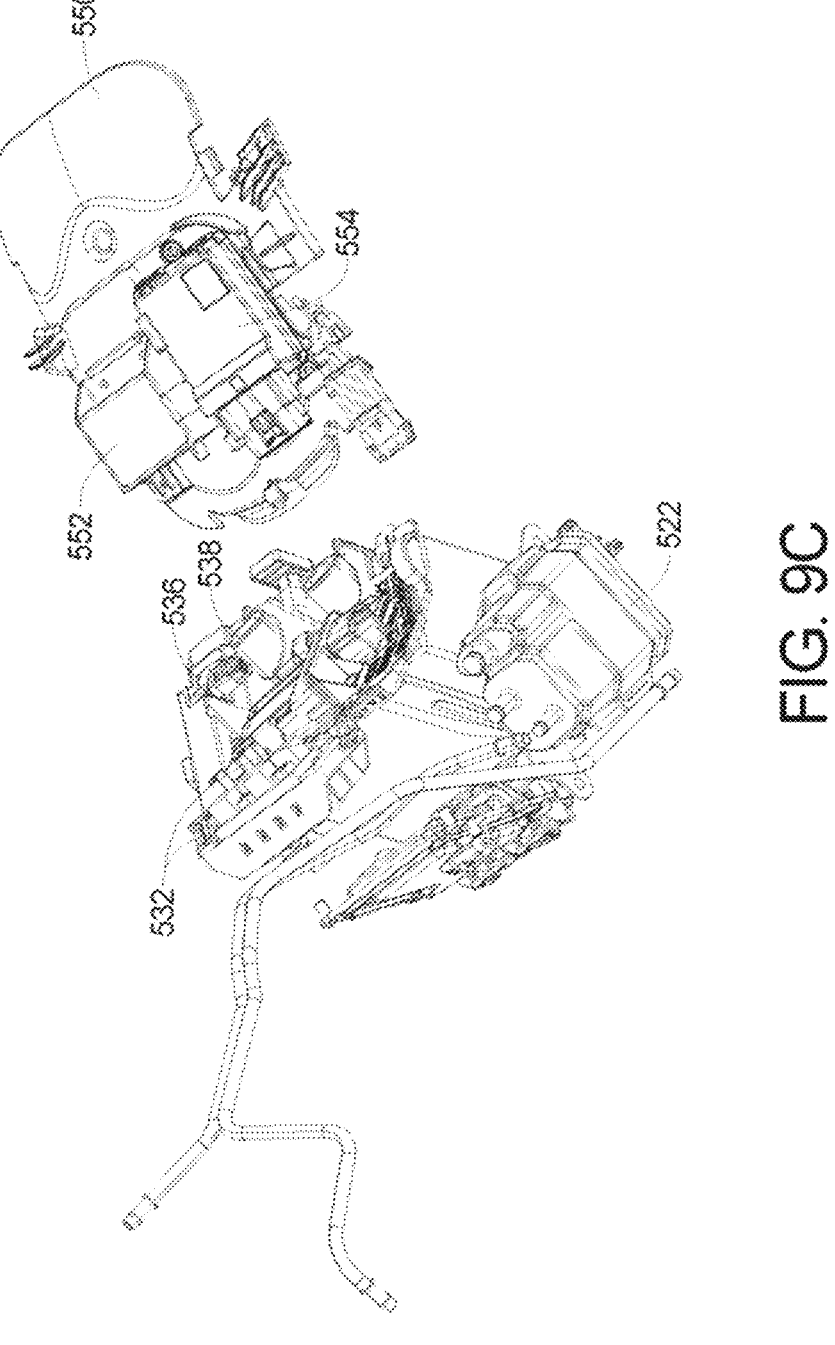
FIG. 9C is partially exploded view of the rear fender module mount and the electrical box cover.

As is best shown in FIG. 9B, the electrical box 500 houses a battery 510 and an engine control module 512. A bracket strap 514 is used to secure the battery 510 within the electrical box 500.

A fuse box 520 is also disposed underneath the seat. The fuse box 520 may be a weather sealed component and extends between the upper twin portions 62.

An evaporative canister 522 is also coupled to the upper twin portion 62. The evaporative canister 522 may be an optional element and provided where required by law.

The electrical box 500 includes a cover 530. The cover 530 includes tabs 532 that engage at least one wall of the electrical box 500.

A starter 534 is disposed under the seat area adjacent to the electrical box 500.

The cover 530 may also house antennas thereon. A tire pressure monitoring system antenna 536 as well as a key fob antenna 538 may be incorporated onto the cover 530.

In FIGS. 9A and 9B, the lower fender 154 is illustrated. The lower fender 154 has a module mount 550 coupled thereto. The module mount 550 is used for securing a cellular modem 552 and a vehicle control module 554. Tabs 556 extending from the module mount 550 are used to the secure the cellular modem in the vehicle control module 554 to the module mount. The tabs 556 may be integrally molded with the module mount 550. In the alternative, other types of fasteners besides tabs 556 may be used. For example, straps and various types of fasteners may be use to mount the modules to the module mount 550.

Referring now to FIGS. 10A-10D, the rear fender assembly 100 was briefly described above. The rear fender assembly 100 includes the module mount 550, the cellular modem 552, the vehicle control module 554, the lower fender 154 and an upper fender 570. The upper fender 570 is coupled to the lower fender 154 having a volume therebetween so that cellular modem 552, the vehicle control module 554 and the connector coupled thereto are disposed within the volume. The upper fender 570 may have an upper reflector 572 coupled thereto. Also, tail lights 574 may also be coupled to the rear fender assembly 100 and more specifically to either the lower fender 154 or the upper fender 570 or both. The tail lights 574 may act as rear marker lights and as turn signals. The tail lights 574 may each be mounted to a respective arm 576, 578. The right arm 578 couples to the upper fender and has a wire 580 that is routed therethrough. The left tail light 574 is mounted to the left arm 576 which also has wires 582 disposed therein. A support 584 may extend between the tail lights 574 and the arm 576, 578. The left arm 576 may be configured differently than the right arm 578. In this example, a license plate holder 586 is rotatably coupled to left arm 576. The license plate holder 586, being pivotal, may fold if contacting the ground or other obstruction. The license plate holder 586 has one or more recesses 588. In this example, the recess 588 receives a GPS antenna 590. The license plate holder 586 has an extension 592 that extends upwardly from the top of the license plate holder 586. The extension 592 may house a license plate lamp 594. The license plate lamp 594 shines light on the surface of the license plate (not shown) when properly mounted on the face of the license plate holder 586. The wires for the license plate lamp 594 and the GPS antenna 590 extend through the left arm 576.

The license plate holder 586 may also house one or more electronic communication components 591 used for communicating with devices outside the motorcycle. The electronic communication components 591 may include an RFID tag, a NFC communication device, a global positioning system, a vehicle-to-vehicle communication device, an Internet-of-things communication device, an AM or FM receiver or antenna, or the like. The electronic communication component 591 may be an open road tolling transponder.

Figure 10A:
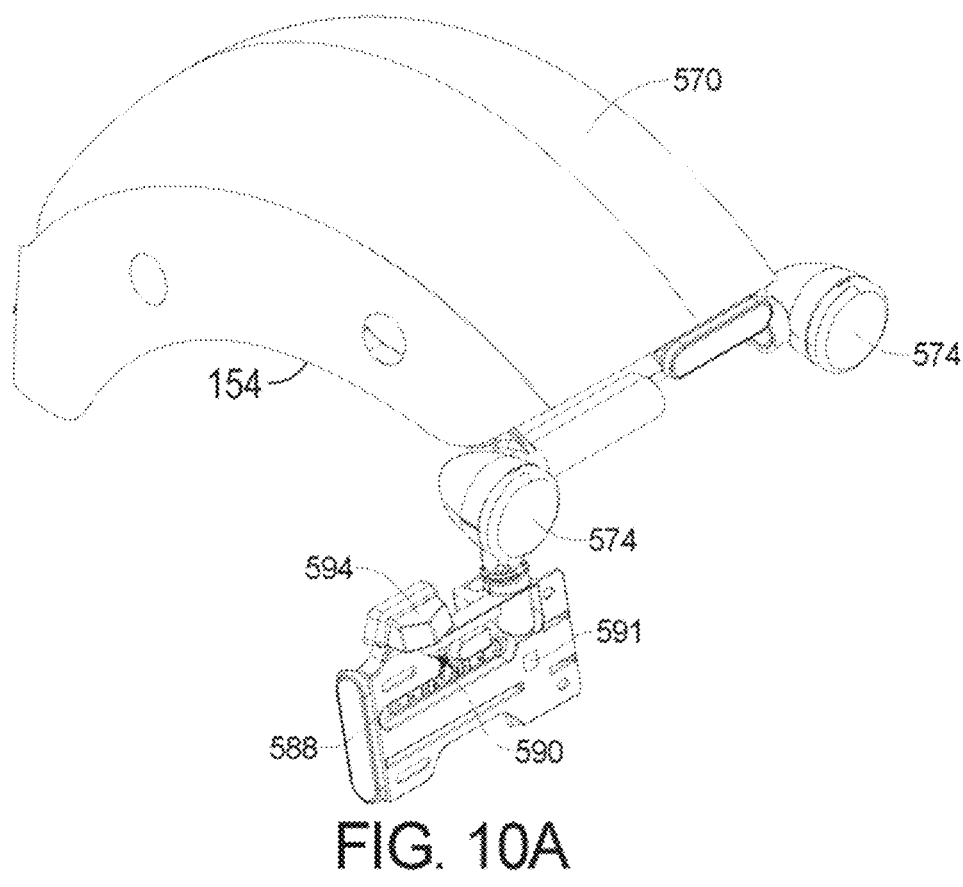
FIG. 10A is a perspective view of the rear fender assembly having the license plate mount.
Figure 10B:
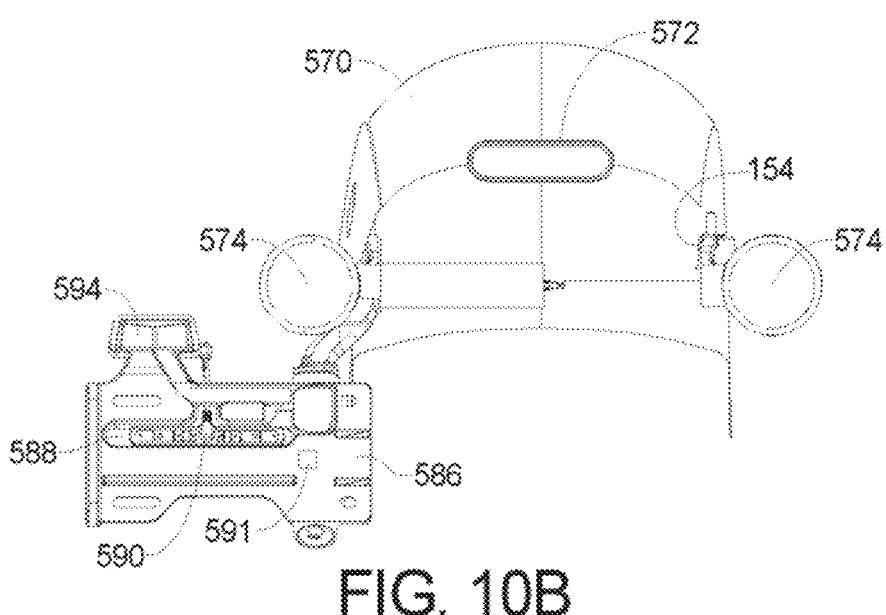
FIG. 10B is a rear view of the license plate mount coupled to the rear fender assembly.
Figure 10C:
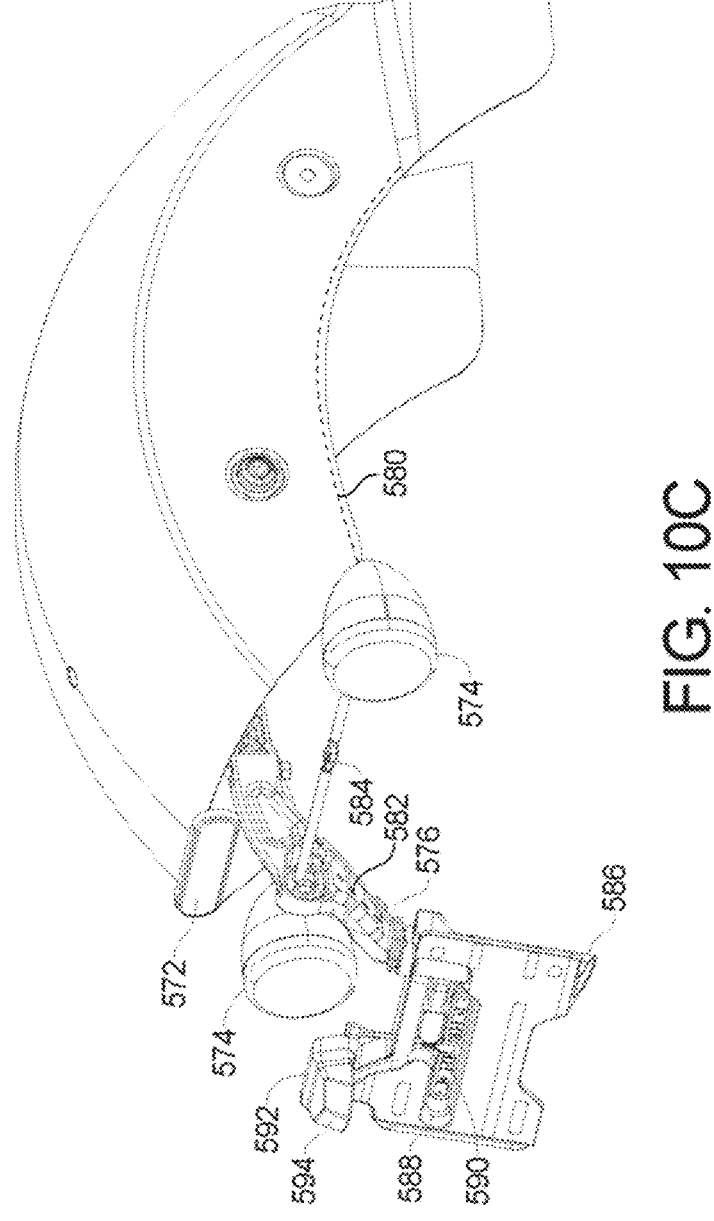
FIG. 10C is a partial cutaway view of the license plate holder and the left arm of the vehicle.
Figure 10D:
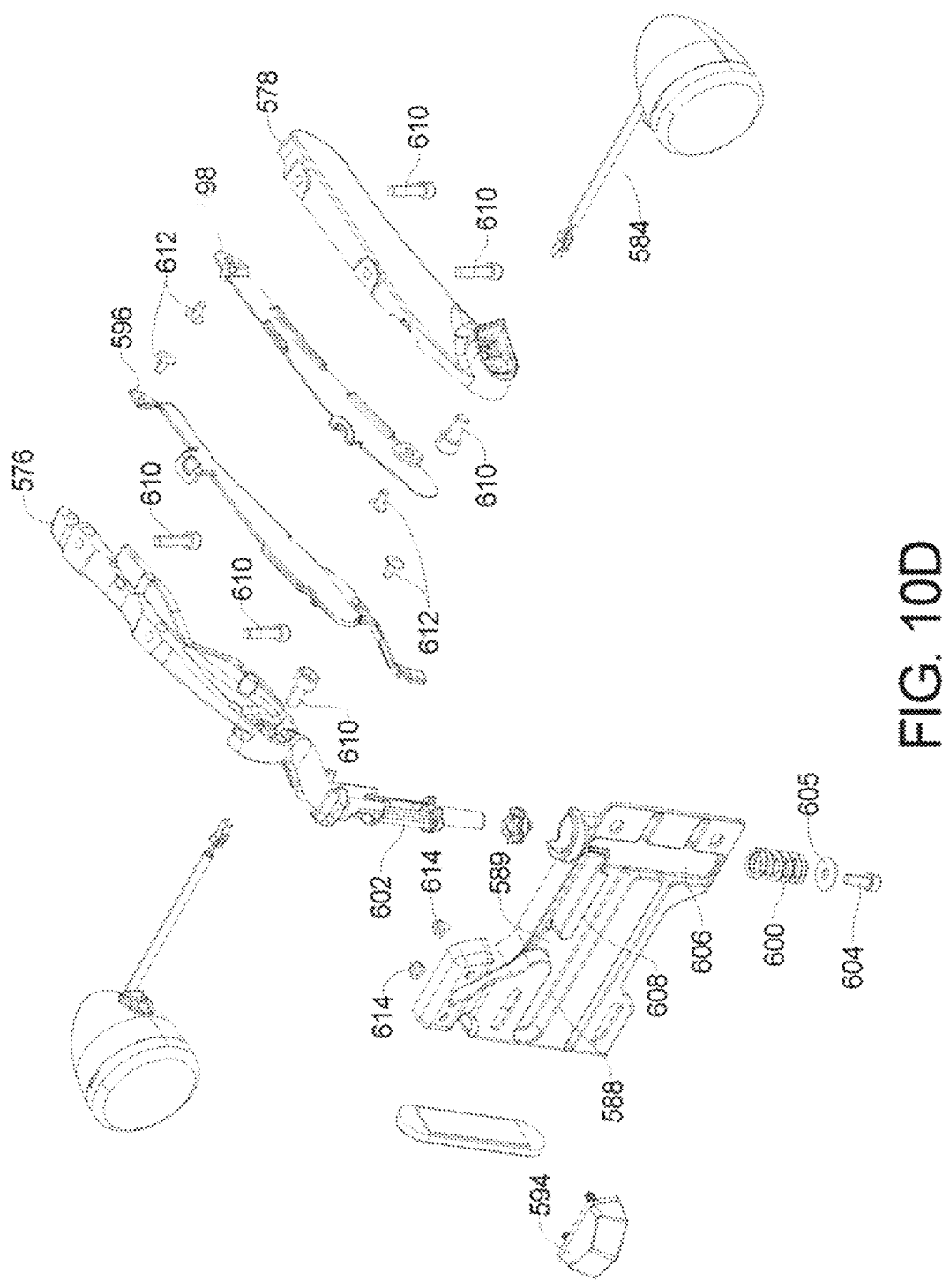
FIG. 10D is an exploded view of the left arm, the right arm and license plate holder illustrated in FIGS. 10A-10C.

Referring now to FIG. 10D, the license holder 586 and the left arm 576 are illustrated in further detail. The left arm 576 may further include a retainer 596 to retain any wires therein. Likewise, a retainer 598 retains wires within the right arm 578. The license plate holder 586 may have a spring 600 disposed therein to prevent the rotation of the license plate holder 586 relative to the pivot 602. The pivot 602 may be integrally formed or formed as a separate component as the left arm 576. The pivot 602 forms an axis around which the license plate holder 586 may rotate. Should the motorcycle 10 be laid down, the license plate holder 586 may pivot out of the way. FIG. 10D also shows a recess 589 that is used for the wires and license plate lamp 594.

A retainer 604 and washer 605 retains the spring 600 within a channel 606 that also receives the pivot 602. A portion 608, at the end of the recess 589, receives the wire for GPS antenna and the license plate wire and communicates the wire into the pivot 602 and then through the left arm 576.

Fastener 610 are used to join the left arm 576 and the right arm 578 to the fender assembly. Fastener 612 join the retainers 596 and 598 to the left arm 576 and the right arm 578 respectively. Nuts 614 join the license plate lamp 594 to the license plate holder 586.

The foregoing description of the examples has been provided for purposes of illustration and description. It is not intended to be exhaustive or to limit the disclosure. Individual elements or features of a particular example generally not limited to that particular example, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motorized vehicle having a frame and a wheel rotatably coupled to the frame, said vehicle comprising:
   a first fender housing mounted to the frame;
   a second fender housing coupled to the first fender housing so that a volume is defined therebetween; and
   an electronic component disposed in the volume;
   a first arm rotatably coupling a license plate holder to the first fender housing;
   a turn signal coupled to the first arm and a turn signal wire and the license plate holder coupled to a license plate lamp wire, said turn signal wire and the license plate lamp wire disposed at least partially within the first arm.

2. The motorized vehicle as recited in claim 1 wherein the electronic component comprises a cell phone modem.

3. The motorized vehicle as recited in claim 1 wherein the electronic component comprises a vehicle control module.

4. The motorized vehicle as recited in claim 1 wherein the electronic component comprises a cell phone modem and a vehicle control module.

5. The motorized vehicle as recited in claim 1 further comprising a battery box coupled to the frame, said battery box housing a battery.

6. The motorized vehicle as recited in claim 5 wherein the battery box is disposed below a seat of the vehicle.

7. The motorized vehicle as recited in claim 5 wherein the battery box comprises a cover.

8. The motorized vehicle as recited in claim 7 wherein the cover is snap fit to the battery box.

9. The motorized vehicle as recited in claim 5 wherein the battery box comprises a lower surface acting as a debris shield for a rear wheel.

10. A motorized vehicle having a frame and a wheel rotatably coupled to the frame, said vehicle comprising:
    a first fender housing mounted to the frame;
    a second fender housing coupled to the first fender housing so that a volume is defined therebetween;
    an electronic component disposed in the volume;
    a first arm rotatably coupling a license plate holder to the first fender housing;
    a turn signal coupled to the first arm; and the license plate holder comprises a cellular antenna disposed in a recess in a surface thereof;
   the cellular antenna is coupled to an antenna connecting wire, wherein the antenna connecting wire is disposed at least partially within the first arm.

11. A motorized vehicle having a frame and a wheel rotatably coupled to the frame, said vehicle comprising:
    a first fender housing mounted to the frame;
    a second fender housing coupled to the first fender housing so that a volume is defined therebetween; and
    an electronic component disposed in the volume;
    a battery box coupled to the frame and housing a battery, the battery box comprising a cover, the cover comprising a key fob antenna.

12. The motorized vehicle as recited in claim 11 further comprising a license plate holder coupled to the first fender housing.

13. The motorized vehicle as recited in claim 12 wherein the license plate holder comprises a second electronic communication component coupled thereto.

14. The motorized vehicle as recited in claim 11 further comprising a first arm rotatably coupling a license plate holder to the first fender housing.

15. The motorized vehicle as recited in claim 14 wherein the first arm is further coupled to a turn signal.

16. A motorized vehicle having a frame and a wheel rotatably coupled to the frame, said vehicle comprising:
    a first fender housing mounted to the frame;
    a second fender housing coupled to the first fender housing so that a volume is defined therebetween; and
    an electronic component disposed in the volume;
    a battery box coupled to the frame and housing a battery, the battery box comprises a wireless control module disposed therein.

17. The motorized vehicle as recited in claim 16 wherein the wireless control module comprises at least one of a key fob controller and a tire pressure monitoring controller.

18. A motorized vehicle having a frame and a wheel rotatably coupled to the frame, said vehicle comprising:
    a first fender housing mounted to the frame;
    a second fender housing coupled to the first fender housing so that a volume is defined therebetween; and
    an electronic component disposed in the volume;
    a battery box coupled to the frame and housing a battery; and
    a tray comprising a battery tender, wire routing features and an integrated tool holder.

* * * * *